United States Patent
McKown

(10) Patent No.: US 11,188,872 B2
(45) Date of Patent: *Nov. 30, 2021

(54) SYSTEM AND METHOD FOR IDENTIFICATION, PERFECTION, COLLECTION, AND VALUATION OF THIRD-PARTY CLAIMS INCLUDING SUBROGATION CLAIMS

(71) Applicant: Recovery Data Connect, L.L.C., Overland Park, KS (US)

(72) Inventor: James R. McKown, Stilwell, KS (US)

(*) Notice: Subject to any disclaimer, the term of this patent is extended or adjusted under 35 U.S.C. 154(b) by 159 days.

This patent is subject to a terminal disclaimer.

(21) Appl. No.: 15/700,148

(22) Filed: Sep. 10, 2017

(65) Prior Publication Data
US 2017/0372432 A1    Dec. 28, 2017

Related U.S. Application Data

(63) Continuation of application No. 14/139,360, filed on Dec. 23, 2013, now abandoned, which is a continuation-in-part of application No. 12/622,247, filed on Nov. 19, 2009, now Pat. No. 8,615,409, which is a continuation of application No. 11/107,528, filed on Apr. 15, 2005, now abandoned.

(51) Int. Cl.
| G06Q 40/08 | (2012.01) |
| G06Q 50/18 | (2012.01) |
| G06Q 10/10 | (2012.01) |
| G06Q 20/14 | (2012.01) |

(52) U.S. Cl.
CPC ........... *G06Q 10/10* (2013.01); *G06Q 20/14* (2013.01); *G06Q 40/08* (2013.01); *G06Q 50/18* (2013.01)

(58) Field of Classification Search
CPC ......... G06Q 40/02; G06Q 40/08; G06Q 50/22
USPC .............................................................. 705/2
See application file for complete search history.

(56) References Cited

U.S. PATENT DOCUMENTS

| 7,840,422 B1* | 11/2010 | Hail ..................... G06Q 10/087 |
| | | 705/2 |
| 2003/0028474 A1* | 2/2003 | Butler ................... G06Q 10/10 |
| | | 705/37 |

FOREIGN PATENT DOCUMENTS

WO    WO-0131417 A2 *  5/2001  ............. G06Q 40/02

OTHER PUBLICATIONS

Irving, A., & Flaherty, K. (2001). Protecting the subrogation rights of self-insured group health plans. Employee Benefits Journal, 26(2), 22-25. https://dialog.proquest.com/professional/docview/218414475?accountid=131444 (Year: 2001).*

* cited by examiner

*Primary Examiner* — Hiep V Nguyen

(57) ABSTRACT

A method has been provided that associates insurance payment linking information with litigation information and associates insurance payment information with the insurance payment linking information and the litigation information to identify a potential third-party claim or a potential subrogation claim. Associating the insurance payment linking information with the litigation information may further include associating at least one medical procedure code with at least some of the litigation information.

80 Claims, 7 Drawing Sheets

| | | | | | | | | | | | | | | |
|---|---|---|---|---|---|---|---|---|---|---|---|---|---|---|
| ASBESTOS CLAIM | KEYWORDS — 408 | MESOTHELIOMA, LUNG CANCER, ASBESTOSIS.... | | | | | | | | | | | | |
| 402 | DRG INFORMATION | 75 | 76 | 77 | 78 | 79 | 80 | 82 | 85 | 86 | 87 | 89 | ... | |
| 426 | DRG CONFIDENCE | 90 | 87 | 88 | 98 | 85 | 87 | 88 | 90 | 95 | 98 | 92 | ... | |
| | ... | | | | | | | | | | | | | |
| WELDING ROD INJURY CLAIM | KEYWORDS | PARKINSON'S DISEASE, MANGANESE POISONING.... | | | | | | | | | | | | |
| | DRG INFORMATION | 12 | 15 | 16 | 17 | 18 | 19 | 20 | 22 | 23 | 24 | 25 | ... | |
| | DRG CONFIDENCE | 92 | 95 | 97 | 94 | 92 | 93 | 96 | 97 | 98 | 93 | 94 | ... | |
| | ... | | | | | | | | | | | | | |
| VIOXX CLAIM | KEYWORDS | HEART, CARDIAC, CORONARY... | | | | | | | | | | | | |
| | DRG INFORMATION | 103 | 104 | 105 | 106 | 107 | 108 | 109 | 110 | 111 | 115 | 116 | ... | |
| | DRG CONFIDENCE | 90 | 87 | 88 | 98 | 85 | 87 | 88 | 90 | 95 | 98 | 92 | ... | |
| | ... | | | | | | | | | | | | | |
| FEN-PHEN CLAIM | KEYWORDS | CHEST, RESPIRATORY... | | | | | | | | | | | | |
| | DRG INFORMATION | 75 | 76 | 77 | 78 | 79 | 80 | 82 | 85 | 86 | 87 | 89 | ... | |
| | DRG CONFIDENCE | 87 | 98 | 94 | 95 | 92 | 93 | 96 | 97 | 92 | 90 | 91 | ... | |
| | ... | | | | | | | | | | | | | |

FIG. 4A

720 — LAWSUIT
    722 — TYPE: ABSESTOS LAWSUIT
    724 — DATE FILED: 31-JAN-05
    726 — CASE NUMBER: CV-05-05685
    728 — JURISDICTION: TEXAS FEDERAL – NORTHERN DISTRICT OF TEXAS
    742 — DAYS PENDING: 20
    744 — LAWYER: CARL COUNSEL
    746 — LAWYER'S ADDRESS: 253 NORTH PARK WAY
                              DALLAS, TX 75021

730 — INSURANCE PAYMENTS

| | PAYMENTS | CONFIDENCE LEVEL |
|---|---|---|
| 732 — 75 MAJOR CHEST PROCEDURES | | |
| 1/24/2004 | $ 15,000.00 — 734 | 95% — 736 |
| 1/31/2004 | $ 156,785.64 | 95% |
| 732 — 82 RESPIRATORY NEOPLASMS | | |
| 1/31/2004 | $ 6,500.00 | 91% |
| 732 — 409 RADIOTHERAPY | | |
| 3/24/2004 | $ 5,000.00 | 77% |
| 4/24/2004 | $ 5,000.00 | 77% |
| 5/24/2004 | $ 5,000.00 | 77% |
| | TOTAL | AVERAGE |
| | $ 193,285.64 — 738 | 93% — 740 |

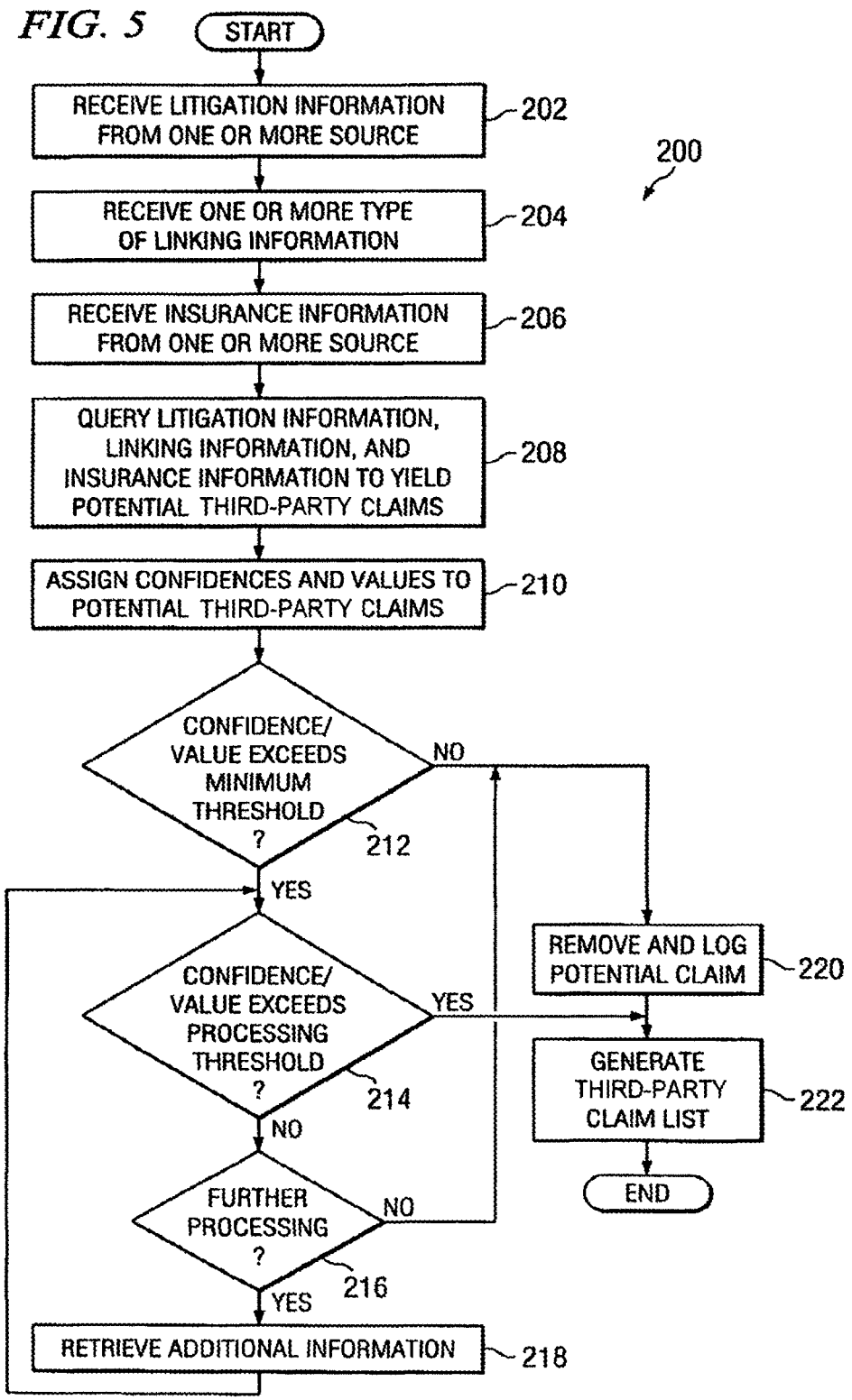

SYSTEM AND METHOD FOR IDENTIFICATION, PERFECTION, COLLECTION, AND VALUATION OF THIRD-PARTY CLAIMS INCLUDING SUBROGATION CLAIMS

CROSS-REFERENCE TO RELATED APPLICATIONS

This application is a continuation of U.S. application Ser. No. 14/139,360 filed on Dec. 23, 2013 entitled SYSTEM AND METHOD FOR IDENTIFICATION, PERFECTION, COLLECTION, AND VALUATION OF THIRD-PARTY CLAIMS INCLUDING SUBROGATION CLAIMS, which is a continuation-in-part of U.S. application Ser. No. 12/622,247 filed on Nov. 19, 2009 (now U.S. Pat. No. 8,615,4091 entitled SYSTEM AND METHOD FOR IDENTIFICATION, PERFECTION, COLLECTION, AND VALUATION OF THIRD-PARTY CLAIMS INCLUDING SUBROGATION CLAIMS, which is a continuation of U.S. application Ser. No. 11/107,528 filed Apr. 15, 2005, entitled SYSTEM AND METHOD FOR IDENTIFICATION, PERFECTION, COLLECTION, AND VALUATION OF THIRD-PARTY CLAIMS INCLUDING SUBROGATION CLAIMS (now abandoned). All of the above-referenced applications are incorporated herein by reference.

TECHNICAL FIELD OF THE INVENTION

This invention relates in general to the field of third-party claims and, more particularly, to a system and method for identification, perfection, collection, and valuation of third-party claims including subrogation claims.

BACKGROUND OF THE INVENTION

A third-party claim is generally the legal right of a first party who has paid for the loss of a second party to obtain compensation from a third party who is responsible for the loss. Third-party claims commonly arise with insurance payments, for example, in the context of a subrogation claim or a priority claim. As an example, an insurance company (the first party) may become "subrogated" or substituted to the rights of its insured (the second party) to the extent of the insurance company's payment for damage caused by the third party. One type of insurance payment in which third-party claims arise is medical insurance payments. "Subrogation claims" and "priority claims" are types of third-party claims.

SUMMARY OF THE INVENTION

According to one embodiment of the present invention a method comprises associating insurance payment linking information with litigation information and associating insurance payment information with the insurance payment linking information and the litigation information to identify a potential third-party claim or a potential subrogation claim. Associating the insurance payment linking information with the litigation information may further include associating at least one medical procedure code with at least some of the litigation information.

Certain embodiments may provide a number of technical advantages. For example, a technical advantage of one embodiment may include the capability to identify potential third-party claims. Other technical advantages of other embodiments may include the capability to weigh a confidence and value of potential third-party claims against a threshold.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 4A depicts a method of linking or associating insurance payment linking information with litigation information, according to an embodiment of the invention;

FIG. 5 depicts a process of identifying a third-party claim, according to an embodiment of the invention;

DETAILED DESCRIPTION OF EXAMPLE EMBODIMENTS

Figure 1:
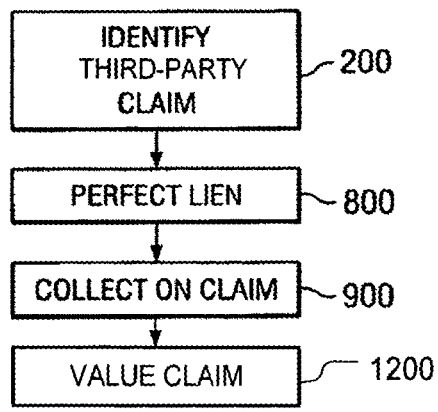
FIG. 1 depicts a general process of recovering a third-party claim, according to an embodiment of the invention.

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

Third-party or subrogation rights can arise in a litigation setting. For example, a plaintiff (the insured or second party) may bring a lawsuit to seek recovery for damages associated with a medical injury caused by a third party. To the extent that an insurance company has already made payments for the injury, the insurance company may have a third-party or subrogation claim that can be asserted as a lien against a portion of the damages recovered by the plaintiff in the lawsuit. By some estimates, only 2% of subrogation claims ever get collected. Every year, hundreds of thousands of individuals assert personal injury claims in thousands of different courts throughout the United States. No national registry of all of those lawsuits exists. Likewise, ever year, insurers pay for the treatment of millions of persons. At present, there is no efficient way for health insurers to know whether one of their insurers has filed a lawsuit related to an injury for which the insurer has paid to treat. As a result, insurers typically fail to assert most potential third-party claims.

In certain circumstances, insurance companies may assign their potential third-party or subrogation claims to a separate entity for consideration (e.g., a dollar amount). Such assignments provide insurers with certainty about the amount that they will receive from a portfolio of potential third-party or subrogation claims. In such circumstances, the risk transfers to the entity purchasing the assigned claims. Additionally, insurers benefit by obtaining capital promptly rather than incurring the delays and expense of pursuing third-party or subrogation claims. Information concerning the likely outcome of potential claims (e.g., the percentage likely to be recovered and the amount of time and expense entailed in pursuing recovery) may greatly assist in assessing the value of such assignments.

In asserting a third-party claim and associated lien, time is of the essence. For example, upon payment of an insurance claim, the insurance company foregoes the interest which would accrue from investing those funds. When each individual claim is aggregated amongst the thousands of potential subrogation claims of each insurer, the collective loss on this time value of money is often substantial. Additionally, according to some case law, rights in a third-party claim may be limited (if recoverable at all) when settlement of a plaintiff's lawsuit occurs before the lien is perfected. Further, even if the lien can be perfected after settlement, the money may have already transferred from one party to another, further complicating and delaying any potential recover, and typically increasing the expense of such recovery efforts.

One societal consequence of not asserting insurance third-party claims early enough (or not at all) is higher insurance premiums—a consequence that has an effect on all persons in the United States with private health insurance. Therefore, it would be preferable to identify a claim and perfect a lien associated with the claim as early as possible in a lawsuit and before settlement. Accordingly, among other things, embodiments of the invention provide a system and method for identifying third-party claims, perfecting the lien, collecting on the claim, and valuing the third-party claim. Although various embodiments will be described with reference to recovery of third-party claims in medical insurance settings, other embodiments may utilize the techniques to recover on third-party claims in a variety of other settings, such as third-party claims associated with automobile, disability, homeowners insurance and the like.

FIG. 1 depicts a general process 100 for recovering a third-party claim, according to an embodiment of the invention. The process 100 begins at a process 200 of identifying a third-party claim. The general process 100 may then proceed to a process 800 of perfecting a lien associated with a third-party claim and a process 900 of colleting on the claim. The general process may then value the third-party claim at process 1200. In some embodiments, only one or two of the processes 200, 800, 900, and 1200 of the general process 100 may be undertaken, while in other embodiments all four of the processes 200, 800, 900, and 1200 may be undertaken. Further details of engaging in one, two, three or all four of processes 200, 800, 900, and 1200 according to various embodiments will be described in further details below.

Figure 2:
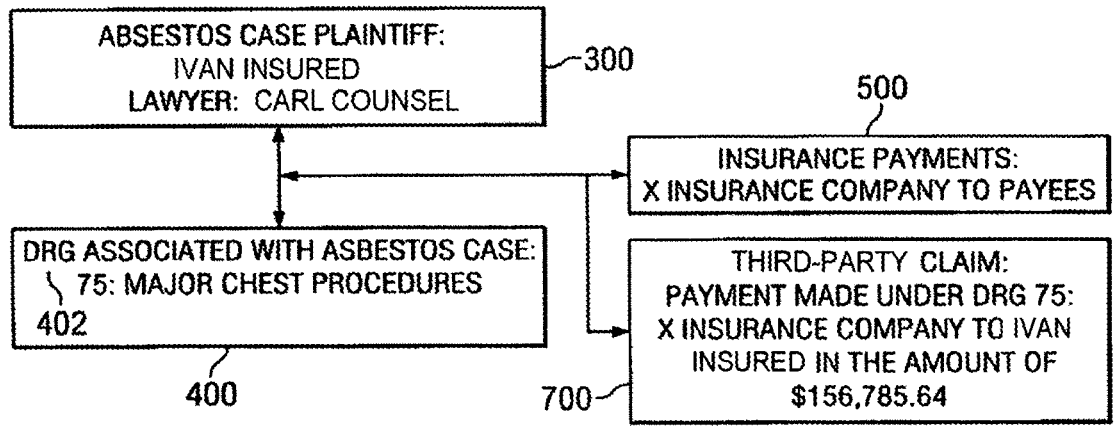
FIG. 2 depicts a process of identifying an insurance third-party claim, according to an embodiment of the invention.

FIG. 2 depicts a process of identifying an insurance third-party claim, according to an embodiment of the invention. The diagram in this embodiment illustrates an engagement of linking a litigation claim with payments made to insurance payees. The process depicted in FIG. 2 has been simplified for purposes of illustration and brevity. A portion of the litigation information 300 indicates that a lawsuit has been filed involving a claim for damages relating to asbestos (e.g., exposure to asbestos). Among other information available in the litigation information 300 may be the name of the plaintiff (in this embodiment, Ivan Insured) and the name of the plaintiff's lawyer (in this embodiment, Carl Counsel).

Insurance payment linking information 400 has been associated with litigation information 300 and may include any of a variety of information generally operable to facilitate the linking or mapping of a particular litigation claim to an insurance payment and/or payments. In this embodiment, the insurance payment linking information 400 includes a category from diagnostic related grouping (DRG) information 402. Although, more than one DRG code category may be associated with the DRG information 402, only one DRG code category is shown for purposes of brevity. The determination of the appropriate insurance payment linking information 400 to associate with litigation information 300 may be determined, for example, by an expert with knowledge of the categories of DRG information 400 that should be associated with an asbestos claim. The category of the DRG information 402 chosen in this illustrative embodiment is DRG 75, corresponding to Major Chest Procedures. Thus, the category of DRG information 400 (e.g., DRG 75, corresponding to Major Chest Procedures) is associated or linked with the litigation information 300 (e.g., Ivan Insured' asbestos claim).

Insurance payment information 500 may generally include information on insurance payments made to insurance payees. Examples of such insurance payment information 500 includes, but is not limited to, an identity of the payee, the amount of payment, the date of the payment, and identity of the medical procedure associated with the payment. Some insurance companies use DRG code categories, among other medical codes, to identify particular medical procedures. Therefore, the insurance payment information 500 may have a DRG code category and/or categories associated with a particular insurance payment. With this insurance payment information 500, a third-party or subrogation claim list 700 may be identified. As one example of a method of identifying third-party claims, the litigation information 300 and insurance payment linking information 400 may form a query that can be applied to the insurance payment information 500. An example query may be: search for all payments made for DRG category 75 that were paid to or on behalf of Ivan Insured. Any of a variety of logic encoded in software, hardware, or combination of both may be utilized to accomplish such a task. The resultant third-party or subrogation claim list 700 may be the result of this query, identifying a potential third-party claim against Ivan Insured. For example, in this embodiment the third-party claim identified is a payment made under DRG 75 to Ivan Insured in the amount of $156,785.64. With such information, a lien may be sought against Ivan Insured to recoup any damages he may receive for the asbestos claim.

Figure 3:
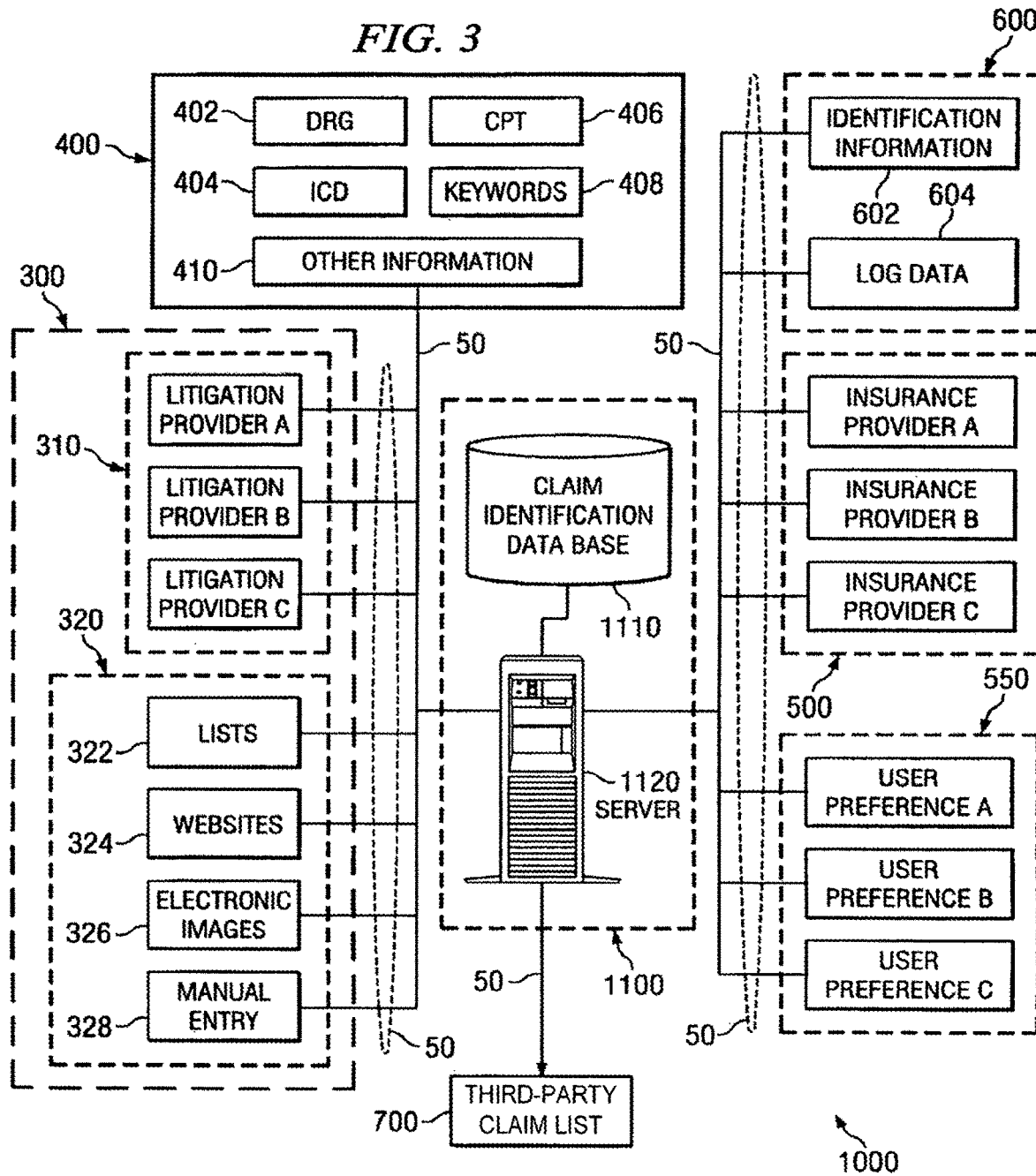
FIG. 3 depicts an architecture of a system that may be utilized to identify third-party claims, according to an embodiment of the invention.

FIG. 3 depicts an architecture of a system 1000 that may be utilized to identify third-party claims, according to an embodiment of the invention. The system 1000 of FIG. 3 generally includes a third-party claim identification system 1100 that in this embodiment is in communication with litigation information 300, insurance payment linking information 400, insurance payment information 500, user preference information 550, and enhancement information 600. Using the litigation information 300, insurance payment linking information 400, insurance payment information 500, user preference information 550 and enhancement information 600, the third-party claim identification system 1100 may produce the third-party claim list 700. Although specific component parts of the system 1000 will be described below, other embodiments of the system 1000 may utilize more, less, or alternative component parts. Accordingly, the architectural configuration of the system 1000 may be varied significantly, or alternatively substituted with any suitable component parts. For example, although the third-party claim identification system 1100 is generally described as a central system in FIG. 3, the third-party claim identification system 1100 may be a distributed system with component parts distributed in various geographical locations.

The third-party claim identification system 1100 in this embodiment includes a claim identification database 1110 and a server 1120. Although one claim identification database 1110 and one server 1120 are shown in FIG. 3, in other embodiments, the third-party claim identification system 1100 may include a plurality of claim identification databases 1110 and a plurality of servers 1120. The litigation database 1100 in some embodiments may be a relational database or a relational database management system (RDBMS) that organizes data into tables with rows and columns to show the relationships between items. In such relational databases, additional tables may be formed from the combination and/or filtering of other tables. Additionally, queries may be ran on any of the tables or combination of tables using a variety of query languages such as structured query language (SQL). Such cross-referencing or querying of tables may extract and/or manipulate information from various tables to produce a report, such as the third-party list 700. Examples of software platforms for relational databases and/or RDMS include, but are not limited to, Microsoft Access, Microsoft SQL server, Oracle, MySQL, IBM's DB2 and FileMaker. Yet other SQL databases, ROMS, and relational databases may additionally be utilized. Although the litigation database 1100 has been described as a relational database architecture in this embodiment, other embodiments may utilize any other software or hardware configuration operable to store data and derive relationships amongst the data.

The server 1120 may be any of a variety of commercially available servers operable to process data and communicate with the claim identification database 1110, litigation information 300, insurance payment linking information 400, insurance payment information 500, user preference information 550, and enhancement information 600. As the data and file formats from litigation information 300, insurance payment linking information 400, insurance payment information 500, user preference information 550, and enhancement information 600 may be varied, the server 1120 may host a variety of different software packages, including any of a variety of commercial off the shelf packages to convert to a file format suitable for storing and manipulating data in the claim identification database 1110. For example, litigation information 300 may include an image formatted file (e.g., PDF image or TIFF image) which may be processed with an optical character recognition (OCR) engine on the server 1120 to convert the image to data. As another example, data from litigation information 300 may initially be a flat file ASCII, HTML, XML, or other data formats and converted to a suitable format for storage and manipulation in the claim identification database 1110.

The claim identification database 1110 and server 1120 of the third-party claim identification system 1100 upon receipt of information (e.g., litigation information 300, insurance payment linking information 400, insurance payment information 500, user preference information 550, and enhancement information 600) may generally store such information or data in a plurality of tables in the claim identification database 1110. Utilizing a variety of processes and techniques, associations amongst the information or data may be derived (e.g., a query similar to that described with reference to FIG. 1) to produce a third-party claim list 700. Further details of associations will be described below.

The receipt of the litigation information 300, insurance payment linking information 400, insurance payment information 500, user preference information 550 and enhancement information 600 by the third-party claim identification system 1100 may be dynamic in some embodiments. In other words, new data may continuously be fed into the third-party claim identification system 1100. Accordingly, the claim identification database 1110 may have different storage areas for different information. For example, the claim identification database 1110 may have an active storage area reflecting pending lawsuits; a semi-active storage area reflecting cases that have settled, but which potential claims still exist against bankrupt entities (e.g., a party may have filed a proof of claim or may be listed as an unsecured creditor on a debtor's schedules); and an archive storage area for old claims. The third-party claim identification system 1100 may generally dedicate more processing resources to the active storage area than the semi-active storage area and more processing resources to the semi-active storage area than the archive area.

To facilitate communication between the third-party claim identification system 1100 and each component part supplying the litigation information 300, insurance payment linking information 400, insurance payment information 500, user preference information 550, and enhancement information 600, any of a variety of communication links 50 may be utilized including, but not limited to, the Internet, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

The litigation information 300 may generally be any of variety of public and private sources of information, concerning claims that either have been or will be asserted against another party. The litigation information 300 in this embodiment includes commercial litigation information providers 310 and other litigation data sources 320. The commercial litigation information providers 310 may generally include any service provider capable of providing information on lawsuit filings in various courts, including, but not limited to local, state, and federal court filings. Examples of such service providers include, but are not limited to Courtlink by Lexis; CourtHouse News Service (CNS); CourtExpress; WestDocket by Westlaw; and Pacer (e.g., via bulk download service as well as individual case retrieval service). Although three commercial litigation information providers 310 are shown in this embodiment (e.g., litigation information providers A, B, and C), more or less commercial litigation information providers 310 may be provided in other embodiments of the system 1000. As briefly referenced above, the format provided by these different service providers may vary. Accordingly, if the data and/or file format is not in a format suitable for manipulation in the claim identification database 1110, the server 1120 may convert the incoming data and/or files from the litigation information providers A, B, and C. Such a conversion may include data conversion and optical character recognition (OCR) of image files.

The other litigation data sources 320 may include, amongst others, lists 322, website data 324, electronic images 326, and manually entered data 328.

Lists 322 may include any of a variety of lists of information of litigation claimants seeking damages (e.g., personal injury damages) against another party. An example list is a list associated with bankruptcy claims. Before a bankruptcy, most companies defend lawsuits in dozens, if not hundreds, of different courts. At the beginning of most bankruptcy actions, the debtor typically is required to file a schedule identifying all known creditors. When a company files a petition in bankruptcy court because of a deluge of mass tort litigation, that company's schedules often reflect every plaintiff with a pending claim or lawsuit or in some instance unpaid judgment or settlement. Once a company files a bankruptcy petition, claims against that company typically wind up consolidated in a single court. As an example with regards to asbestos bankruptcies, in order for an individual to recover for personal injuries allegedly caused by exposure to asbestos or asbestos-containing products formerly designed, distributed, manufactured, marketed, or sold by a bankrupt entity, the individual often must file a proof of claim with the bankruptcy court or its designated claims manager by a date set by the court. Those claims records generally are available to the public for a fee.

A list 322, such as a bankruptcy list, may be ascertained by contacting a bankruptcy court, bankruptcy claims administrator, or bankruptcy counsel and inquiring as to whether either debtor's schedules of unsecured creditor identifies personal injury claimants or the bankruptcy is still pending and whether creditors have begun asserting personal injury claims. If so, the schedules or list may be obtained from the court and fed into the system 1000. Additionally, in many large volume bankruptcies, the parties retain an independent claims administrator approved by the bankruptcy court, which administers the claims. In such instances, the bankruptcy list may similarly be obtained from the claims administrators and fed into the system 1000.

Lists 322 may additionally be obtained from court reporting firms that report on depositions associated with particular types of cases, for example, asbestos cases.

Yet further lists 322 may be obtained from quasi-public record depositories that handle case filings. One example is the Central Records Depository of Madison County, Illinois. Although example lists 322 have been described herein, a variety of other lists may be utilized and obtained, including those which may not yet be developed.

Website data 324 may generally include any litigation data made publicly available through court, claims administrator, debtor, defendant or plaintiff websites. A variety of commercially available technologies and/or techniques may be utilized to monitor such websites.

Electronic images 326 may either be images scanned or faxed from a remote location or scanned locally, for example, upon receipt of a hard copy of litigation information.

Manually entered data 328 may generally include information entered into the system 1000, for example, upon receipt of a hard copy of litigation information and entry by a human operator.

Information that may be extracted from the litigation information 300 includes, but is not necessarily limited to, the nature of the suit; the disease or injury (if available); the name of the case; the case number; the jurisdiction in which the case is pending; the date the case or claim was filed; the plaintiff/claimant's last name; the plaintiff/claimant's first name; the plaintiff/claimant's middle name and/or middle initial; the plaintiff/claimant's social security number (in whole or in part); the plaintiff/claimant's mailing address; the plaintiff/claimant's county of residence; the plaintiff/claimant's state of residence; the employer of the plaintiff; the union of the plaintiff (if applicable); the plaintiff/claimant's attorney; the defendants; the defendant's attorney; attorneys for both the plaintiff/claimant and defendants; the firms for the attorneys; the mailing addresses for the attorneys; the telephone numbers for the attorneys; other contact information for the attorneys; the claimant's alternate attorney; name of firm for alternate attorney; alternate attorney's mailing address; alternate attorney's telephone number; date of deposition (if any); the date the case is set for trial or for plan confirmation; defendant's attorney; the date information received and/or entered; and the operator who entered the data.

Although the above information has been described, the litigation information 300 may include yet further information. For example, for each piece of information, the litigation may include the source or sources of the information—e.g., a bankruptcy list, Courtlink, Courthouse News Service, Court Reporter, etc. Such information may help expedite additional follow-ups that may be helpful in efforts to negotiate a favorable resolution of a perfected lien, and may be helpful in ascertaining the value of similar liens.

In the gathering of litigation information 300, duplicate entries may be created. For example, various lists 322 may be duplicative of other lists 322 or information gathered from commercial litigation information providers 310. Accordingly, the database software platform, associated with the third-party claim identification system 1100 may be operable to either flag or remove duplicative entries. Removal of duplicative entries may avoid the risk of asserting two third-party claims against the same individual.

The insurance payment linking information 400 may include any of a variety of information generally operable to facilitate the linking or mapping of a particular litigation claim to an insurance payment and/or payments. In this particular embodiment, the insurance payment linking information 400 includes diagnostic related groupings (DRG) information 402, international classification of diseases (ICD) information 404, current procedural terminology (CPT) information 406, keywords 408, and other information 410.

DRG information 402, ICD information 404, and CPT information 406, amongst other items, may generally include information on DRG, ICD, and CPT codes. DRG, ICD, and CPT code are generally recognized in the medical and insurance industries as coding schemes, which identify particular medical procedures.

Keywords 408 may generally be words associated with a type of medical procedure—e.g., "chest X-ray"—that may show up in an explanation of an insurance payment.

The other information 410 may generally include any other information that is used as an explanation of a medical payment. Linking such codes, keywords, and other information with claims arising in litigation may generally facilitate a linking of the litigation claim to an insurance payment and/or payments.

Insurance payment linking information 400 in some embodiments may be specialized and/or expert knowledge of specific DRG information 402, ICD information 404, CPT information 406, keywords 408, or other information 410 associated with a particular type of claim in the litigation information 300. A further description of method of associating insurance payment linking information 400 with litigation information 300 will be described below with reference to FIG. 4A.

The insurance payment information 500 may generally include information, concerning insurance payments made to or on behalf of a particular individual. For example, in this embodiment, the insurance information may include the name of the individual; the address of the individual; the type of medical procedure associated with the payment; the medical coding categories associated with the payment—e.g., diagnostic related groupings (DRG) coding categories, current procedural terminology (CPT) coding categories, and international classification of diseases (ICD) coding categories; the amount of the payment; the date of the payment; information submitted by the medical facility or individual in requesting insurance payment; and other identification information associated with the payment. Although three insurance providers (insurance providers A, B, and C) have been shown in FIG. 3, other embodiments may include more or less insurance providers. The information from each insurance provider (e.g., insurance provider A, B, and C) in some embodiments may be kept separate, for example, to produce separate third-party claims lists 700 for each insurance provider.

In some embodiments, portions of the insurance payment information 500 may be selectively sent to the third-party claim identification system 1100, for example, as requested by the claim identification system 1100. As an example, the claim identification system 1100 may only be processing linking information 400 associated with certain types of claims—e.g. an asbestos claim. Accordingly, the claim identification system 1100 may only request insurance payment information 500 associated with particular linking information 400. As a simple illustrative example, the claim identification system 1100 may only request insurance payments coded with particular DRG categories. Thus, a filter may be run at the insurance provider (e.g., insurance provider A, B, or C) to extract only insurance payments made to the requested DRG categories. The extracted results may reduce the amount of data transmitted from the insurance provider (e.g., insurance provider A, B, or C) to the claim identification system 1100. Thus, the insurance payment information 500 in some embodiments may not be a global list of every insurance payment, but rather a selective list of insurance payments associated with a particular category or type of linking information 400.

A similar filtering technique may also be utilized with the litigation information 300. For example, a query may be run with litigation providers 310 (e.g., litigation provider A, B, or C) to retrieve only cases likely to have third-party claims.

The enhancement information 600 may generally include a variety of information to enhance the identification and/or selection of third-party claims. For example, enhancement information, among other items, may include identification information 602 and log data 604. The identification information 602 may generally be any information associated with an individual from either public or private data sources. As a simple example, a directory may have information on the current address or social security of a plaintiff in a lawsuit. As another example, a lawyer directory (e.g., Martindale-Hubble) may have contact information for a particular lawyer. Identification information 602 may generally be utilized to either verify existing data—e.g., retrieved from litigation information 300 or insurance payment information 500—or to fill in data gaps to increase confidence in the data.

Log data 604, among other items, may generally include data retrieved from the process 1200, described in further details below. Process 1200 may generally establish valuation information for potential third-party claims based on previous processing, resolution, or recovery of third-party claims. As an example, the valuation information may include settlement values obtained for different third-party or subrogation claims in different jurisdictions. For example, the valuation information may indicate that an asbestos case settles for "X" percentage in "A" jurisdiction and "Y" percentage in "B" jurisdiction. Information such as this may be utilized by entities considering the purchase of rights in potential third-party or subrogation claims. And, in some embodiments, the valuation information may be utilized in a negotiation of a purchase price for potential subrogation claims. The log data 604 may additionally include information on previous experiences with particular individuals, law firms, or courts, which in some embodiments may be part of the valuation of potential claims. In some embodiments, information such as this may be included in the third-party list 700, for example, being considered a factor in the value of a potential third-party claim.

User preference information 550 may relay a variety of information, concerning a user's preference with regards to various parameters of the system 1000. User preference information 550 may, for example, come from the insurance providers (e.g., insurance providers A, B, and/or C) and other potential clients of the system 1000. To facilitate user preference information 550 being entered into the system 1000, any of a variety of interfaces may be utilized. For example, in one embodiment a user with authentication information may be able to log-in to a portion of the server 1120 to reach a portal, which allows the user preference information 550 to be dynamically entered.

The third-party list 700 may generally be formed through associations identified amongst litigation information 300, insurance payment linking information 400, insurance payment information 500, user preference information 550, and enhancement information 600. A variety of relational database techniques and other techniques may be utilized to retrieve these associations. Some of these techniques were identified above—e.g., queries amongst tables representing litigation information 300, insurance payment linking information 400, insurance payment information 500, user preference information 550, and enhancement information 600 to produce a report or third-party list 700. Further details will be described below.

Although a variety of information (e.g., the litigation information 300, insurance payment linking information 400, insurance payment information 500, user preference information 550, and enhancement information 600) has been described as being utilized to yield the third-party list 700 with the potential third-party claims, some embodiments may not utilize all the types of information. For example, some embodiments may only cross-reference the litigation information 300 with the insurance payment information 500 to yield a potential third-party claim. Other embodiments may only cross reference the litigation information 300, the enhancement information 600, and the litigation information 300 to yield a potential third party claim.

FIG. 4A depicts a method of linking or associating insurance payment linking information 400 with litigation information 300, according to an embodiment of the invention. The insurance payment linking information 400 in the depiction of FIG. 4A has been arranged in a table with a plurality of records 420, 430, 440, and 450. Each of the plurality of records 420, 430, 440, and 450 generally represents a type of litigation claim. For example, record 420 represents an asbestos claim, record 430 represents a welding rod injury claim, record 440 represents a VIOXX claim, and record 450 represents a FEN-PHEN claim. Although not expressly shown, in some embodiments the table of the insurance payment linking information 400 may include hundreds or even thousands of records representing other types of claims.

Each of the plurality of records 420, 430, 440, and 450 contains insurance payment linking information 400 typically associated or applicable with the particular type of claim. For example, the asbestos record 420 includes keywords 408 (e.g., "MESETHELIOMA" "LUNG CANCER", and "ASBESTOSIS") and categories of DRG information 402 (e.g., 75, 76, 77) applicable to asbestos claims. Although not expressly shown, each record may include other types of insurance payment linking information 400, including other categories of medical procedures codes, including, but not limited to, ICD information 404 and CPT information 406. The association of varying types of linking information 400 in some embodiments may enhance the linking or association of the insurance payment linking information 400 with the insurance payment information 500—e.g., by accounting for the varying types of information that may be associated with a particular insurance payment in the insurance payment information 500.

In each record of the insurance payment linking information 400 (e.g., records 420, 430, 440, and 450) an expert may generally determine the applicable association. For example, with regards to the asbestos claim record 420, an expert may determine the DRG code categories 422 of DRG information 402 associated with payments for asbestos related injuries. As an additional enhancement, the expert may associate a confidence 424 with each specific code category 422 in each respective record. Further details of confidences will be discussed below with reference to FIGS. 4B and 4C.

A record in the insurance payment linking information 400 may generally be invoked or triggered upon a determination of the type of suit and/or claims involved in the litigation information 300. For example, upon determination that the suit and/or claim involved is an asbestos claim, the asbestos claim record 420 may be invoked or triggered and thus the insurance payment linking information 400 associated therewith may be linked to the suit and/or claim.

A determination of the type of suit and/or claim involved may be determined in a variety of manners. For example, keywords, the nature of the suit (e.g., as identified on the civil cover sheet), the defendant, and other items in the litigation information 300 may be reviewed (e.g., by a processor in some embodiments or by a human in other embodiments) to determine the type of suit and/or claim. As one example, keywords—e.g., "asbestos" and "exposure" and "injury"—along with the defendant being an asbestos manufacturer may indicate that the case or claim is an asbestos claim. A variety of different technologies may be utilized, including a variety of different search engine technologies to determine the type of case, and the record in the insurance payment linking information 400 most appropriate for the type of case.

Figures 4B, 4C:
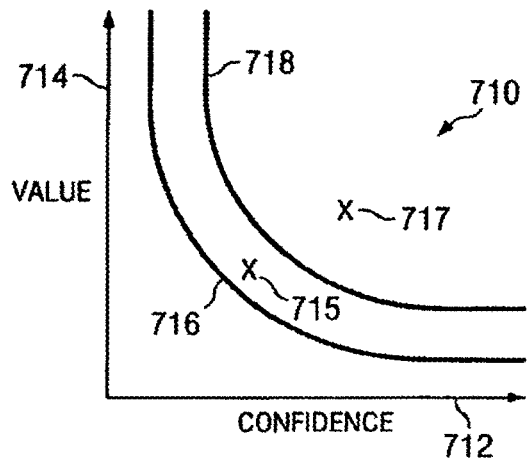
FIG. 4B depicts a two-dimensional graph taking into consideration value and confidence levels, according to an embodiment of the invention.
FIG. 4C depicts an entry on a third-party claim list, according to an embodiment of the invention.

FIGS. 4B and 4C illustrate the generation of a third-party or subrogation claim list 700 using threshold amounts. In the identification of potential third-party claims, two parameters may be reviewed: a confidence that the claims being asserted in the lawsuit relate to insurance payments made to or on behalf of an individual (payee) and a value of the insurance payments believed to be related to the claims asserted in the lawsuit. With regards to confidence, two confidence levels may be reviewed: a confidence that the insurance payee and litigation claimant are the same person and a confidence that the claims being asserted in the lawsuit relate to the insurance payments to the payee.

With regards to confidence that the insurance payee and litigation claimant are the same person, a variety of parameters may be reviewed. For example, if social security numbers of the payee and claimant match, the confidence may be extremely high. On the other hand, if only the names match and the results return payments made to twenty individuals with the same name, the confidence may be relatively low. Additional information may be reviewed to increase confidence that the payee and claimant are the same individual. For example, in some embodiments, the address, middle name place of employment, and type of injury may be reviewed to increase confidences. When such information is not available in the litigation information 300 or insurance payment information 500, the enhancement information 600 may be utilized.

With regards to confidence that the claims being asserted in the lawsuit relate to the insurance payments, an insurance company may not want to assert, for example, a third-party claim for an asbestos related claim for insurance payments made for medical treatment for a broken arm—unless the broken arm were somehow related to the asbestos claim. Accordingly, confidences may be associated with different categories of payment for a particular claim asserted in the lawsuit. Such confidences, as referenced above, may be determined by an expert and associated with the records in the insurance payment linking information 400. For example, a confidence level may be established for each item in a record in the insurance payment linking information 400. And, the confidence level for the exact same item may be different for different records (e.g., because they relate to different claims).

With regards to the value of a potential third-party claim, an insurance company may not want to assert a lien if it would be cost prohibitive to do so. For example, the cost in asserting the lien for the claim may be more than the value of the potential third-party claim, itself. Accordingly, the value of the potential third-party claim may be reviewed. The value of the potential third-party claim, among other factors, may be based upon insurance payment information 500, enhancement information 600 (e.g., log data 604 or valuation information obtained from process 1200), or both. As an example, a potential-third party claim may identify that an insured "E" is bringing a suit in jurisdiction "C" and that an insurance payment of $50,000 for a particular procedure "B" made on behalf of insured "E" is linked to the suit. The initial $50,000 value of the potential third-party claim may be reduced based on valuation information (e.g., from process 1200), which indicates that recovery on third-party claims (e.g., via settlement) for procedure "B" in jurisdiction "C" only recovers fifty cents on the dollar and that the typical cost involved in recovery of the fifty cents on the dollar is "R" amount of dollars. Thus, the potential recovery value would be (50,000/2−R) dollars. Further value determinations such as this may additionally be utilized, for example, to determine the likelihood of recovery.

As a particular potential third-party claim upon being processed may have a variety of payments associated with a variety of values and confidence levels, a weighted average for the confidence level may be determined for a group of associated payments. Thus, the value of the grouped payments will be summed and the confidence level will represent a weighted average (e.g., weighted accorded to value of payment). In some embodiments, the valuation information from process 1200 may be tied to confidence levels.

FIG. 4B depicts a two-dimensional graph 710, taking into consideration value and confidence levels, according to an embodiment of the invention. In the depiction of FIG. 4B, confidence is measured along a horizontal axis 712 and value is measured along a vertical axis 714. For any given insurance payment or group of insurance payments believed to be associated with a claim asserted in a lawsuit by an individual, the value and confidence of that payment or payments may be plotted. A minimum threshold line 716 may establish a minimum acceptable level for continued consideration of a potential third-party claim for an insurance payment or group of payments. Additionally, a processing threshold line 718 may establish a threshold for potential third-party payments that will be processed—e.g., forwarded on to the third-party claim list 700. The minimum threshold line 716 and processing threshold line 718 may generally be established by information from user preference information 550. Illustration of the minimum threshold line 716 and processing threshold line 718 follow.

Point 717 represents a plot point for a given confidence and value for a particular payment or group of payments (e.g., with regards to group of payments, a weighted confidence) associated with a potential third-party claim. The point 717 exceeds a processing threshold line 718. Therefore, the third-party claim associated with point 717 will be included in the third-party claim list 700. Point 715 represents another plot point for a given confidence and value for a particular payment or group of payments associated with a third-party claim. The confidence and value of plot point 715 is above the minimum threshold line 718, but below the processing threshold line 718. Accordingly, the potential third-party claim may be further considered, but not necessarily processed.

As part of the further consideration with regards to the particular payment or group of payments relating to a potential third-party claim, further information may be gathered from any of the information sources identified in FIG. 3—e.g., the litigation information 300, the insurance payment information 500, the insurance payment linking information 400, the enhancement information 600 or the user preference information 550. For example, the confidence level may go up (shifting the plot point 715 to the right) by cross referencing the identification information 602 or removing payments which drag the weighted confidence of a group of payments down (e.g., when the point represents a group of payments). Storing the information on where the litigation information 300 was obtained (referenced above in discussion of FIG. 3) may facilitate a return to the same reference for additional information from the same source. For example, if Courtlink provided the information for a particular potential third-party claim, system 100 may return to Courtlink, for example, to retrieve a copy of additional pleadings or discovery, which may provide enough information to drive up the confidence or value. For example, the value level may go up by associating other previously undiscovered payments. After such further consideration, the plot for the third-party claim may exceed the processing threshold line 718 and thus, be included in the third-party claim list 700. The user preference information 550 may generally determine how much additional information may be gathered—e.g., based on cost involved and the like.

FIG. 4C depicts an entry on a third-party claim list 700, according to an embodiment of the invention. The third-party or subrogation claim list 700 may in some embodiments generally be the associations identified between the varying information sources of FIG. 3 (e.g., litigation information 300, insurance payment linking information 400, insurance payment information 500, user preference information 550, and enhancement information 600) that exceeded threshold amounts described in FIG. 4B. The third-party or subrogation claim list 700 generally includes information on the lawsuit 720 and information on insurance payments 730. The lawsuit information 720 generally includes the type of the lawsuit 720, the date filed 724, the case number 726, the jurisdiction 728, the days the lawsuit has been pending 742, the plaintiff's lawyer 744, and the lawyer's address 746. Although several types of lawsuit information on the lawsuit have been shown in this embodiment, in other embodiments a variety of other types of lawsuit information may be included, including but not limited to those referenced above with reference to FIG. 3.

The insurance payment information 730 is generally broken down by categories 732, showing particular payments 734, and confidence levels 736 associated with those payments 734. A total of payments 738 and weighted confidence level 740 are additionally shown. Information on the total of payments and weighted confidence level 740 may generally allow an insurance company to identify which third-party claims to pursue first. Thus, for example, the third-party claim list may be sorted with the highest total payments 738 and highest weighted confidence level 740. Additional sorting may also be done, for example, by days the lawsuit has been pending in order to obtain a lien before settlement.

Although one threshold technique has been shown with reference to FIGS. 4B and 4C, a variety of other threshold techniques may be utilized in other embodiments of the invention.

FIG. 5 depicts a process 200 of identifying a third-party claim, according to an embodiment of the invention. In describing the process 200 of FIG. 5, reference will also be made to component parts of the system 1000 of FIG. 3. The process 200 may generally start by receiving litigation information 300 from one or more sources at step 202. Such litigation information in some embodiments, for example, may be received by the server 1120 and transferred to the claim identification database 1110. Upon receipt of the litigation information 300, any of a variety of conversion processes may occur, including data conversion and optical character recognition, to place the litigation information in a suitable format for manipulation. As referenced above, duplicate records in the litigation information 300 (e.g., when litigation information 300 is received from more than one source) may be removed.

The process 200 may proceed by receiving one or more types of insurance payment linking information 400 at step 204. Such information in some embodiments, for example, may be received at the server 1120 and transferred to the claim identification database 1110. As referenced above, this linking information 204 in some embodiments may be a table with records. Each record may have entries determined by an expert as corresponding to a particular type of litigation claim. Thus, when a record is triggered, all the linking information 204 in that record may be associated with a particular litigation claim. Triggering a record, as referenced above, may occur by recognition of the type of suit involved or recognition of certain keywords in the suit that correspond to a primary key of a record.

The process 200 may proceed by receiving insurance payment information 500 from one or more sources at step 206. Such information in some embodiments, for example, may be received at the server 1120 and transferred to the claim identification database 1110. The server 1120 may request subsets of information from the litigation information 500, for example, items filtered as corresponding to particular insurance payment linking information 400. For example, the server 1120 may request that only certain categories of DRGs be transmitted. Such a process may facilitate queries to be conducted at the insurance provider (e.g., insurance provider A, B, or C).

The process 200 may proceed by querying the litigation information 300, insurance payment linking information 400, and insurance payment information 500 to yield potential third-party claims at step 208. The querying may be accomplished in a variety of manners recognized with relational databases. For example, each of the litigation information 300, insurance payment linking information 400, and insurance payment information 500 may be in a separate table within a database (e.g., claim identification database 1110) each table having a plurality of records. Some of the entries in each of the tables may serve as foreign key that associates or triggers a primary key in another table to establish an association. For example, the term "asbestos" in a record of litigation information 300 may trigger a particular record in the insurance payment linking information 400. In turn, one of the items (e.g., DRG information 402, ICD information 404, CPT information 406, keywords 408, and/or other information 410) in the just-triggered record of litigation information 400 along with items (e.g., name of individual) in the litigation information 300 may trigger a payment record in the insurance payment information 500 (e.g., payment made to or on behalf of individual for a certain category of DRG information 402, ICD information 404, or CPT information 406). Thus, a link has been established between the record in the litigation information 300, the record in the insurance payment linking information 400, and the record in the insurance payment information 500. A variety of other techniques for linking data in a relational database will be recognized by one of ordinary skill in the art.

In a similar manner to that described above, records in enhancement information 600 may be linked to other records in the system 100. For example, a record in litigation information 300 may simply reference an attorney's name. The attorney's name may trigger a record in, for example, identification information 602 with an address, contact information, and the like.

The process 200 may proceed by assigning confidences and values to payments associated with potential third-party claims at step 210. Confidences, as referenced above, may generally be confidence that the claims being asserted in the lawsuit relate to insurance payments made to or on behalf of an individual. This assigning of confidence may come from a variety of parameters as described with reference to FIGS. 3, 4B and 4C. Step 212 in some embodiments may be processed in conjunction with step 210.

The process 200 may proceed by determining for each potential third-party claim whether the combination of the confidences and values for the payments exceed a minimum threshold at step 212. If so, the process 200 may proceed to step 214. If not, the potential third-party claim and associated payments may be removed and logged at step 220.

The process 200 may then proceed by determining whether the combination of the confidences and values for a potential third-party claim exceed a processing threshold (e.g., processing threshold 718) at step 214. If so, the process 200 may proceed to step 222. If not, the process 200 may proceed to step 216 where a determination is made as to whether the potential third-party claim should be further processed, for example to push the potential third-party claim above the processing threshold (e.g., processing threshold 718). Inputs for this determination may come from, for example, user preference information 550, information on the value of the payments in the potential third-party claim, and the likelihood that the processing threshold (e.g., processing threshold 718) will be exceeded with additional information. If a determination is made for further processing, the process 200 may proceed to step 218 where further information is gathered and linked with the potential third-party claim. Such information as described with reference to FIGS. 3 and 4B may include, but is not limited to litigation information 300 or enhancement information 600. The process 200 may then loop back to step 214 for another determination as to whether the potential third-party claim exceeds the processing threshold—e.g., whether the additional informational helped the potential third-party claim exceed the processing threshold (e.g., processing threshold 718). If a determination is made to not continue processing at step 216, the potential third-party claim and associated payments may be removed and logged at step 220.

The third-party claims that exceed the processing threshold at step 214 may be included in a generated third-party claim list (e.g., third-party claim list 700) at step 222. A simple example of an entry in a third-party or subrogation claim list 700 is shown in FIG. 4C.

As briefly referenced above, in some embodiments the process 100 of FIG. 1 may end after the process 200 of identifying the third-party claim. For example, a particular client may only request the third-party claim list 700. In other embodiments, further processing may be desired. FIGS. 6A, 6B, 7A, and 7B describe further processing.

Figure 6A:
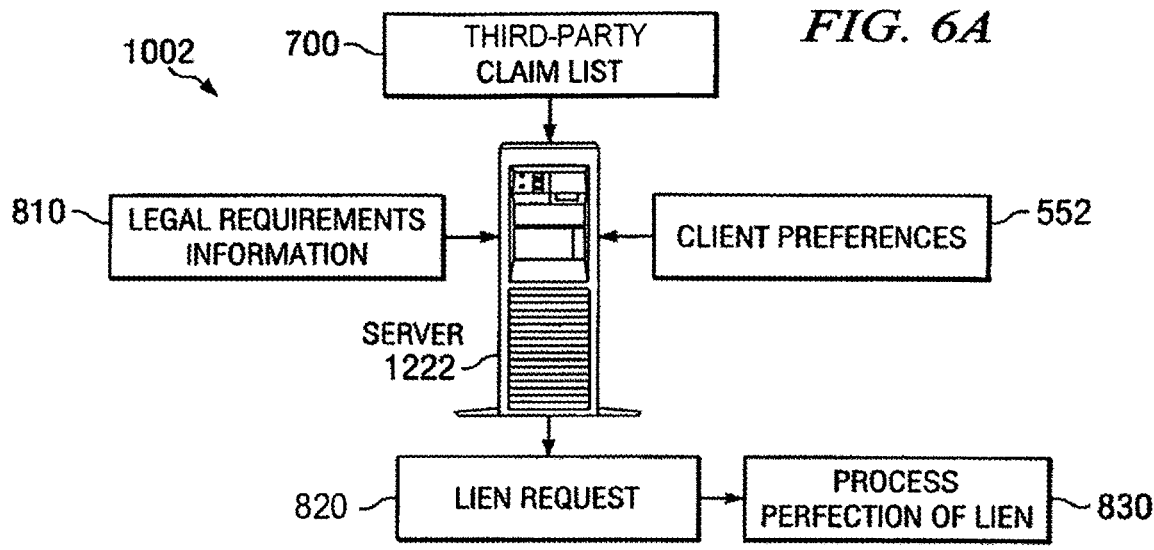
FIG. 6A depicts an architecture of a system that may be utilized to perfect a lien, according to an embodiment of the invention.
Figure 6B:
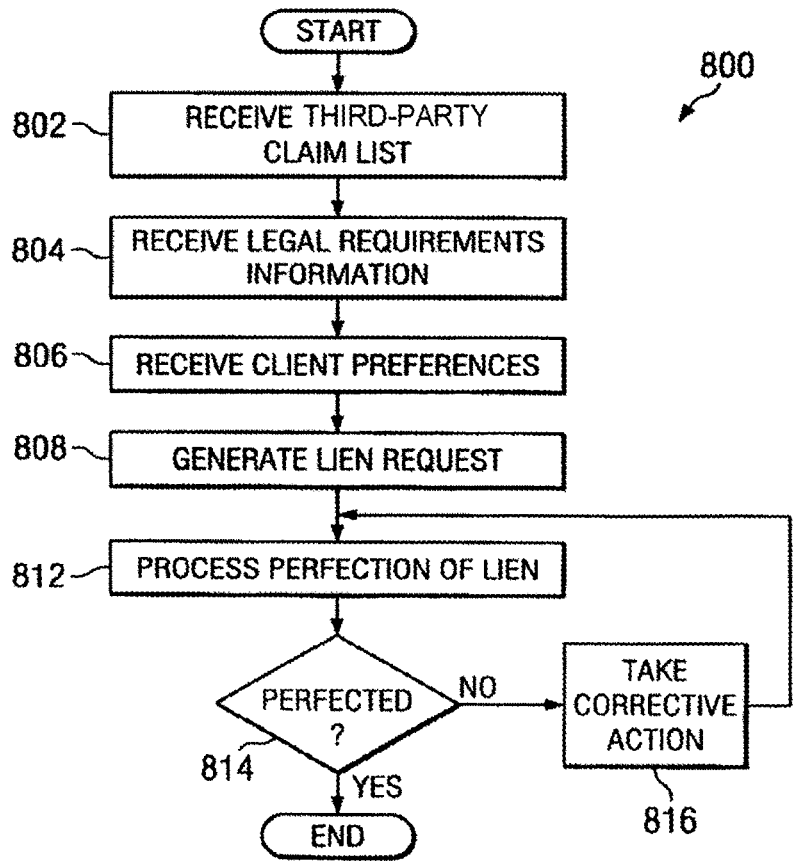
FIG. 6B depicts a process of perfecting a lien, according to an embodiment of the invention.

FIG. 6A depicts an architecture of a system 1002 that may be utilized to perfect a lien, according to an embodiment of the invention. FIG. 6B depicts a process 800 of perfecting a lien, according to an embodiment of the invention. The system 1002 may be integrated with the system 1000 of FIG. 3 in some embodiments. Accordingly, the server 1222 may be the same server of the system 1000 of FIG. 3 in some embodiments. In other embodiments, the server 1222 may be a different server.

In describing the process 800 of FIG. 6B, reference will additionally be made to FIG. 6A. The process 800 begins by receiving third-party or subrogation claim list 700 at step 802. The third-party claim list 700, for example, may be the third-party claim list generated in process 200 of FIG. 5.

The process 800 may then proceed to a receipt of legal requirements information 810 at step 804. The legal requirements information 810 may generally be information on how a lien for a third-party claim is perfected in a variety of jurisdictions.

The process 800 may proceed to a receipt of client preferences 552 at step 806. Client preferences 552 in some embodiments may generally be the form letter that a client prefers or the method of perfecting a lien if a variety of methods are available in a particular jurisdiction.

The process 800 may proceed to a generation of a lien request 820 at step 808. The generation of the lien request may be based in part upon the third-party claim list 700, the legal requirements information 810, and client preferences 552. In some embodiments, such a lien request 820 may be automatically generated, according to the particular legal requirements to perfect the lien in the particular jurisdiction in which the lien will be perfected. As an example, a letter addressed to the lawyer for the litigation claimant may be generated, identifying the third-party claim and payments associated therewith. As another example, a letter, form, or request addressed to a particular authoritative entity may be generated.

The process 800 may proceed to processing perfection of the lien at step 812 or block 830, according to the particular legal requirements in the specific jurisdiction. In some embodiments, this may be accomplished by having a lawyer sign the above-referenced letter and transmitting the letter to the lawyer for the litigation claimant. In other embodiments, a lawyer may sign the above-referenced letter, form, or request and the letter, form or request may be transmitted to the authoritative entity.

The process 800 may proceed to a determination at step 814 of whether or not the lien has been perfected. If so, the process may end. If not, corrective actions make be taken at step 816 and the process 800 looped back to step 812 to process perfection of the lien.

Figure 7A:
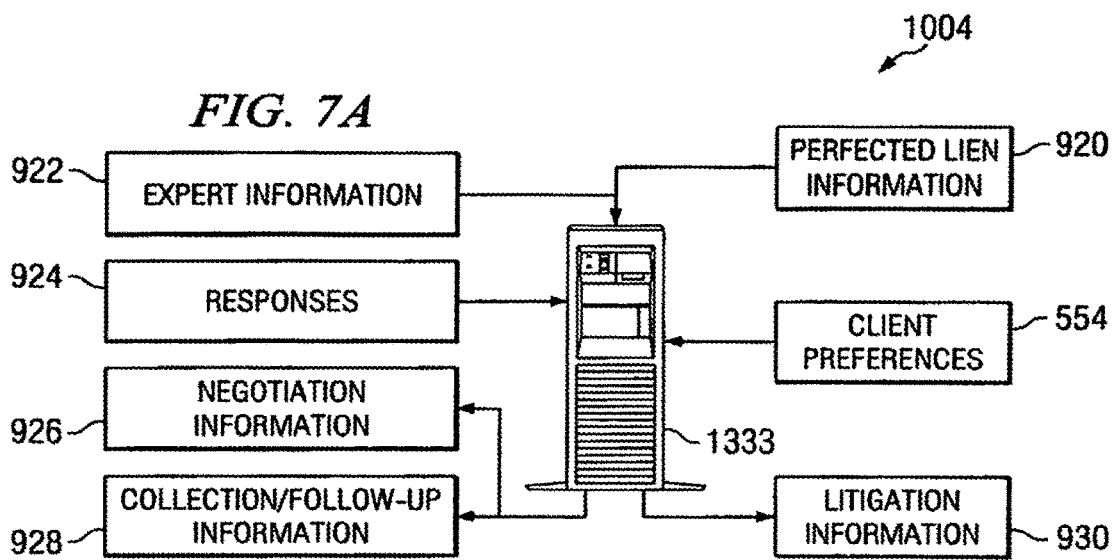
FIG. 7A depicts an architecture of a system that may be utilized to collect on a third-party claim, according to an embodiment of the invention.
Figure 7B:
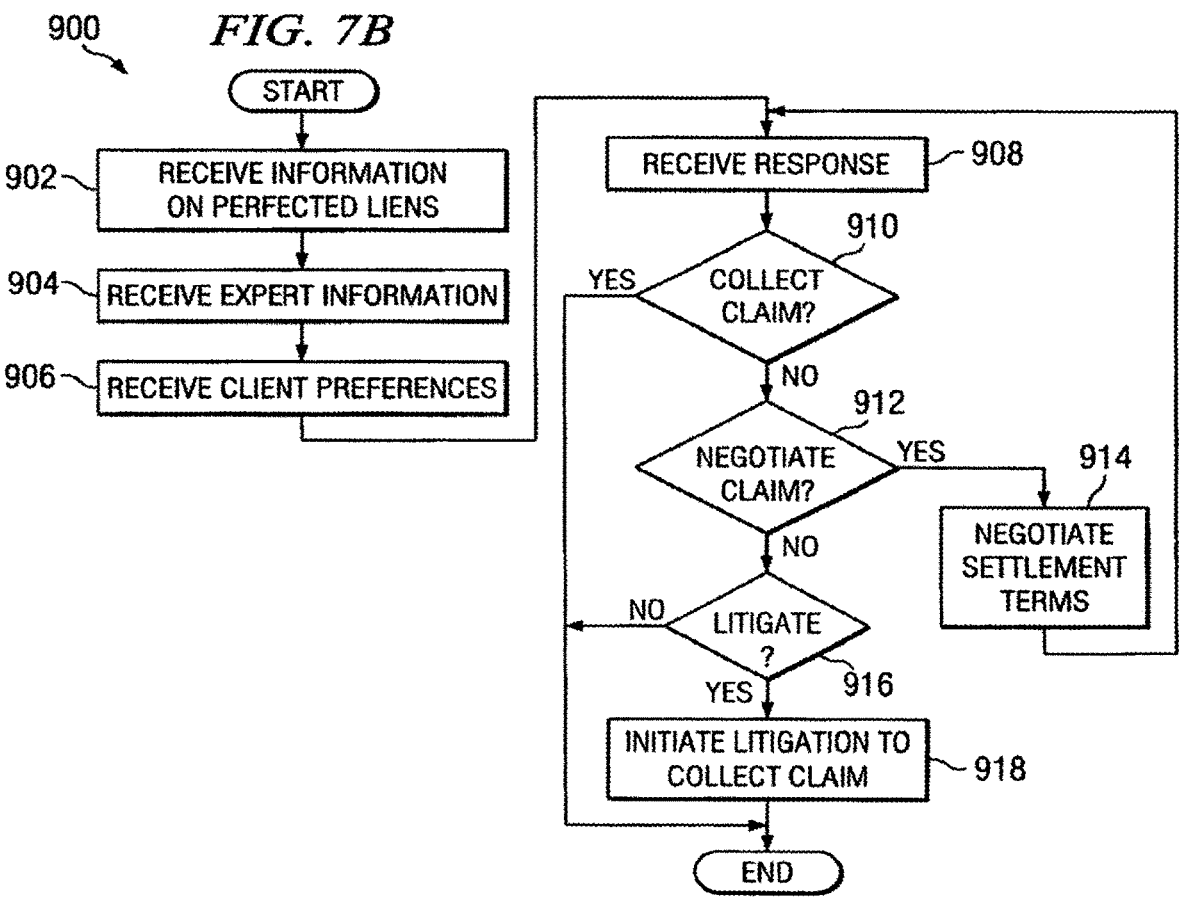
FIG. 7B depicts a process of collecting on a claim, according to an embodiment of the invention.

FIG. 7A depicts an architecture of a system 1004 that may be utilized to collect on a third-party claim, according to an embodiment of the invention. FIG. 7B depicts a process 900 of collecting on a claim, according to an embodiment of the invention. The system 1004 may be integrated with the system 1000 of FIG. 3 in some embodiments. Accordingly, the server 1333 may be the same server of the system 1000 of FIG. 3 in some embodiments. In other embodiments, the server 1222 may be a different server.

In describing the process 900 of FIG. 7B, reference will additionally be made to FIG. 7A. The process 800 may begin by receiving perfected lien information 920 at step 902. This perfected lien information 920 may include information on liens that have been perfected and liens that have not yet been perfected (e.g., liens that are currently being processed).

The process 900 may receive expert information 922 at step 904. The expert information 922 may generally include information to facilitate collection of the claim—e.g., in the negotiation of a settlement, if any. For example, the expert information 922 may include information concerning settlement values for particular types of litigation claims, for example, based on disease, product exposure, defendants, counsels and jurisdictions. Knowledge of such settlement value of litigation claims may facilitate settlement of the third-party claims. Such information also may assist in determining the value of similar potential claims and may create a business advantage in negotiating to purchase an assignment of those potential claims. The expert information 922 may additionally include information on the plaintiff's counsel, key defendants, and defense counsel in particular cases.

The process 900 may receive client preferences 554 at step 906. Such client preferences 554, among other information, may include information on whether a client is willing to settle and, if so, at what percentage of the insurance payments made in the third-party claim. The client preferences 554 may additionally include a variety of other types of information on collection of third-party claims, for example, accounts to where funds should be transferred.

The process 900 may proceed to receipt of responses 924 at step 908. The responses 924, among other items, may generally include responses from the lawyer for the litigation claimant, for example, either in response to a letter for the third-party claim request or response to negotiations for settlement, described below with reference to step 914.

The process 900 may make a determination as to whether or not the claim has been collected at step 910. Collection/Follow-Up information 928 (extracted in part from response 924, perfected lien information 920, expert information 922, and client preferences 554) may be utilized to facilitate this determination. Collection of a claim at step 910 may be a partial collection of a claim, for example, when the process 900 has been looped from a settlement negotiation step of 914, described in further details below. If the claim has been collected, the process 900 may end. If the claim has not been collected, the process may proceed to step 912.

A determination is made as to whether or not to negotiate a particular claim at step 912. If a determination is made not to negotiate, the process may proceed to step 916. If a determination is made to negotiate, the process 900 may proceed to step 914 where settlement terms are negotiated. The process 900 may then be looped back to step 908 to receive the response 924 (e.g., the response to the proposed settlement terms). Step 912 and 914 may utilize negotiation information 926, which may be extracted from server 1333 and be at least partially based on perfected lien information 920, responses 924, expert information 922, and client preferences 554.

A determination is made as to whether or not to litigate a claim at step 916. If so, the process 900 proceeds to step 918 to initiate a lawsuit to collect the claim—e.g., using litigation information 930 extracted from response 924, perfected lien information 920, expert information 922, and client preferences 554. If not, the process 900 may end.

To facilitate processes 800 and 900, any of a variety of case management software packages may be utilized. An example case management software is LegalFiles by Legal Files Software Inc. of Springfield, Ill.

As briefly referenced above, process 1200 may generally involve the establishment of valuation information based, in part, upon an analysis of past and current recovery efforts. Such valuation information, in turn, may be utilized for future recovery efforts (e.g., in the making of an informed decision on the value of potential third-party claims). Process 1200, among other items, may generally involve a statistical analysis of past and current recovery efforts. Data utilized for this statistical analysis may not only come from one or more systems 1000, 1002, and/or 1004 described above, but may also come from other suitable sources. The results of such a statistical analysis may determine that for a specific time period asbestos cases have settled for "X" percentage in "A" jurisdiction and "Y" percentage in "B" jurisdiction. The results of the statistical analysis may additionally determine the cost and/or time typically associated with recovery of certain times of claims in a certain jurisdiction. Yet other statistical information may be utilized.

Valuation information from process 1200 may be utilized by entities considering the purchase of rights in potential third-party or subrogation claims. And, in some embodiments, the valuation information from process 1200 may be utilized in a negotiation of a purchase price for potential subrogation claims. Valuation information from process 1200 in some embodiments may be fed into system 1000 as enhancement information 600 or log data 604. Valuation information as described with reference to FIG. 4B may additionally be utilized to modify a value of a potential third-party claim.

In the above embodiments described with reference to FIGS. 1, 2, 3, 4A, 4B, 4C, 6A, 68, 7A, and 7B, a variety of different pricing schemes may be offered to potential clients in exchange for services. For example, a contingent fee arrangement may be charged to a potential client based on, among other items, a percentage of actual recovery of a third-party claim or a percentage of value identified for a third-party claim. Another pricing scheme may include, but are not limited to, a flat fee for the level of service desired—e.g., one or more of identification, perfection, and claim recovery services. In such flat fee arrangements, larger fees may be charged for some services than others. For example, a larger fee may be charged for the identification service than the perfection service.

Various embodiments described herein may utilize a variety of schemes to streamline recovery of third-party or subrogation claims. For example, as briefly referenced above with user preference information 550 (FIG. 3), client preferences 552 (FIG. 6A), and client preferences 554 (FIG. 7A), a client of the systems 1000 (FIG. 3), 1002 (FIG. 6A), and/or 1004 (FIG. 7A) may generally be allowed to access at least a portion of such systems 1000, 1002, and/or 1004 to give input and/or receive feedback in connection with one, two, three or all of the processes 200, 800, 900, and 1200. Any of a variety of authentication schemes may be utilized in accessing systems 1000, 1002, and/or 1004. For example, a client of one or more of the systems 1000, 1002, and/or 1004 may utilize a user name and password to electronically access servers associated with systems 1000, 1002, and/or 1004. Such authentication credentials may be tagged to a level of access a particular client has in the one or more systems 1000, 1002, and/or 1004. Example feedback may include, but is not limited to, a client viewing status reports on the recovery of various third-party or subrogation claims. Example input may include, but is not limited to, a client with rights in a subrogation or third-party claim entering settlement parameters and/or authorization. The parameters and/or authorization, for example, may indicate a level (e.g., eighty cents on the dollar) at which a settlement offers should automatically be accepted. Further example input may include, but is not limited to, a client posting copies of some or all medical invoices or records which provide the underlying basis for a potential third-party claim, or providing copies of the relevant language in an insurance contract which creates a subrogation right.

In a similar manner, to streamline the recovery process, the one or more systems 1000, 1002, and/or 1004 may receive electronic input (e.g., response 924) from a variety of other entities (e.g., opposing counsel). As one example, a lien request 820 of FIG. 6A sent to an opposing counsel may include authentication information (e.g., a user name and password) that the opposing counsel may use to access the one or more systems 1000, 1002, and/or 1004. Upon accessing the one or more systems 1000, 1002, and/or 1004, the opposing counsel may view the details of the third-party claims and be given the opportunity to submit a settlement offer. Upon entry of the settlement offer, the one or more systems 1000, 1002, and/or 1004 may automatically accept the settlement offer and begin processing the recovery in a suitable manner for the particular circumstances surrounding the third-party or subrogation claim. As one example, the systems 1000, 1002, and/or 1004 may give the opposing counsel financial account numbers to which the opposing counsel should transfer funds to settle the third-party or subrogation claim. Alternatively, the systems 1000, 1002, and/or 1004 may store the settlement offer from the opposing counsel for review by the client when the client accesses the one or more systems 1000, 1002, and/or 1004. The client may, for example, be given a variety of notifications (e.g., email, automated phone call, a letter, other suitable notifications, or combinations of the preceding notification), indicating that a settlement offer has been made and that the settlement offer can be viewed by accessing the one or more systems 1000, 1002, and/or 1004. The one or more systems 1000, 1002, and/or 1004 may then allow the client to either accept the offer or to input a counter-offer, which may then be accessed by opposing counsel when the opposing counsel accesses the one or more systems 1000, 1002, and/or 1004. A similar notification may be given to opposing counsel, indicating that a counter-offer has been placed in the one or more systems 1000, 1002, and/or 1004 (e.g., email, automated phone call, letter, other suitable notifications, or combinations of the preceding notification). Thus, as can be seen above, the one or more one or more systems 1000, 1002, and/or 1004 may serve as facilitator of the negotiation process by facilitating the communication process.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A computer system for identifying a potential third-party claim or a potential subrogation claim, the computer system comprising:
   logic stored in a non-transitory computer readable media such that when executed by a processor:
      receives, from at least a first data store, insurance payment information concerning patients, members or insureds;
      receives, from at least a second data store, that is separate from the first data store, information concerning parties in lawsuits that identify one or more of the parties in lawsuits;
      analyzes the commonality of data elements in the insurance payment information with data elements in the litigation information to match at least one of the patients, members or insureds in the insurance payment information with at least one of the parties in the lawsuits;
      identifies a potential third-party claim or a potential subrogation claim against one of the parties in lawsuits based on the matching, the insurance payment information not being directly or indirectly matched with the litigation information for a potential third-party claim or a potential subrogation claim prior to the analyzing and matching.

2. The computer system of claim 1, wherein absence of the ability to identify one or more potential third-party claims or potential subrogation claims is used to modify business procedures.

3. The computer system of claim 1, wherein the insurance payment information includes one or more of the following:
   (a) amounts paid or payable by an insurer;
   (b) amounts paid or payable by the patient or insured;
   (d) amounts paid or payable by a third-party;
   (d) amounts billed or due from the patient or insured regardless of whether said amount was covered by insurance;

(e) amounts past-due or unpaid from the patient or insured;
(f) a claim, potential claim, or submission of a claim to an insurer or notice thereof;
(g) potential claims identified by an insurer;
(h) insurance enrollment, eligibility information or third-party information, including one or more of:
first name, last name, middle name or initial, maiden name, prior name, date of birth, year of birth, month of birth, age, gender, marital status, insurance effective date, family status, address, identification number, associated family members, social media information or username, email address, name of educational facility at which an individual was a student, geographic location of educational facility or college or university or training institute at which an individual was a student, year or years in which an individual graduated or attended an educational facility or college or university or training institute, courses taken by an individual who attended an educational facility or college or university or training institute, area or areas of educational concentration of an individual who attended an educational facility or college or university or training institute, major or degree of an individual who attended an educational facility or college or university or training institute, alumni or student tracking database information regarding an individual who attended an educational facility or college or university or training institute, or social media information regarding an individual who attended an educational facility or college or university or training institute; and
(i) Date information including but not limited to date of accident, date of incident, date of injury, date of medical procedure, date of submission, date of payment and date of any of the information listed elsewhere in this claim.

4. The computer system of claim 1, wherein the insurance payment information or insured information relates to one or more type of insurance, including one or more of the following:
(a) any type of health insurance;
(b) any type of worker compensation insurance;
(c) any type of liability, homeowners or property casualty insurance;
(d) any type of motorized vehicle insurance;
(e) any type of disability care insurance; or
(f) any type of reinsurance, quota-shared insurance, umbrella insurance, and stoploss insurance regardless of whether the issuer is domestic or foreign.

5. The computer system of claim 1, wherein the litigation information comprises claims corresponding to the parties in the lawsuits and the insurance payment information comprises information concerning payments made, or not made, to or on behalf of the patients, members or insureds; and
the logic matches the claims corresponding to the at least one of the parties in the lawsuit with the payments made, or not made, to the at least one of the patients, members or insureds in the insurance payment information.

6. The computer system of claim 5, wherein the payments made, or not made, to the at least one of the patients, members or insureds in the insurance payment information includes payments made, or not made, either to or on behalf of the at least one of the patients, members or insureds in the insurance payment information.

7. The computer system of claim 5, wherein either the insurance payment information or the litigation information are supplemented by information from third-party sources to match the insurance payment information and the litigation information includes but is not limited to supplemental sources such as:
a) Publicly available or proprietary databases of individuals, families, business entities, business owners;
b) Public filings;
c) Public or private news sources or announcements;
d) Publicly issued licenses including but not limited to hunting licenses, fishing licenses, and marriage licenses;
e) Civil filings including but not limited to divorce decrees and probate filings;
f) Property tax records and property appraisals;
g) Property filings including but not limited to mortgages, foreclosures, and property tax filings;
h) Civil registrations including but not limited to motor vehicle registrations including automobile registrations, motorcycle registrations, truck registrations, boat registrations, all-terrain vehicle registrations and aircraft registrations;
i) Private or Open Source commercial data including but not limited to GPS location data drawn from cellphones, cellphone applications or "'apps'", or other sources;
j) Social media information including but not limited to social media postings and geo-tagged information;
k) Voter registration databases;
l) Telephone or address databases such as whitepages.com;
m) Internet registrations;
n) Publicly filed liens including but not limited to hospital liens and medical provider liens and
o) Accident Reports including but not limited to automobile accident reports, reports prepared by state highway patrol, county sheriff, or municipal police whether publicly filed, publicly available, or contained in non-public or proprietary databases.

8. The computer system of claim 7, wherein multiple lawsuits in the litigation information associated with a given defendant, defendant's insurer, plaintiff, plaintiff's insurer, attorney or any combination thereof are investigated, negotiated or settled simultaneously.

9. The computer system of claim 1, wherein the logic:
receives identification information, the identification information received separate from the insurance payment information and the litigation information, the identification information operable to increase a level of confidence that the at least one of the patients, members or insureds in the insurance payment information is the same person as the at least one of the parties in the lawsuits;
links the identification information to one of the at least one of the patients, members or insureds in the insurance payment information or the at least one of the parties in the lawsuits; and,
wherein the identification information includes but is not limited to information from one or more of (a) publicly available third-party sources, (b) non-publicly available third-party sources, (c) information from internal sources, and (d) information from internal or third-party sources which has been enhanced, amended, or altered by the information in (a), (b), and/or (c).

10. The computer system of claim 9, wherein the received identification information is used to increase, decrease or in any way to adjust or to not adjust the level of confidence that the at least one of the patients, members or insureds in the insurance payment information is the same person as the at least one of the parties in the lawsuits.

11. The computer system of claim 10, wherein the logic uses the resulting adjusted or non-adjusted level of confidence to eliminate or suppress what is deemed to be a false-positive match of the insurance payment information and the litigation information.

12. The computer system of claim 10, wherein either the insurance payment information or the litigation information are supplemented by information from third-party sources to increase, decrease or in any way to adjust or to not adjust the confidence level including but not limited to supplemental sources such as:
   a) Publicly available or proprietary databases of individuals, families, business entities, business owners;
   b) Public filings;
   c) Public or private news sources or announcements;
   d) Publicly issued licenses including but not limited to hunting licenses, fishing licenses, and marriage licenses;
   e) Civil filings including but not limited to divorce decrees and probate filings;
   f) Property tax records and property appraisals;
   g) Property filings including but not limited to mortgages, foreclosures, and property tax filings;
   h) Civil registrations including but not limited to motor vehicle registrations including automobile registrations, motorcycle registrations, truck registrations, boat registrations, all-terrain vehicle registrations and aircraft registrations;
   i) Private or Open Source commercial data including but not limited to GPS location data drawn from cellphones, cellphone applications or "apps", or other sources;
   j) Social media information including but not limited to social media postings and geo-tagged information;
   k) Voter registration databases;
   l) Telephone or address databases such as whitepages.com;
   m) Internet registrations;
   n) Publicly filed liens including but not limited to hospital liens and medical provider liens; and
   o) Accident Reports including but not limited to automobile accident reports, reports prepared by state highway patrol, county sheriff, or municipal police, whether publicly filed, publicly available, or contained in non-public or proprietary databases.

13. The computer system of claim 10, wherein the logic estimates the financial value of one or more matches of the insurance payment information and the litigation information based on one or more considerations such as:
   a) The Court or courts;
   b) The Defense Attorney(s);
   c) The Plaintiff Attorney(s);
   d) The age or date of the action in the litigation information;
   e) Composition, value, age or magnitude of the claims within the insurance payment information;
   f) The medical diagnosis codes associated with the insurance payment information;
   g) The medical provider(s) or type of medical provider(s) associated with the medical payment information;
   h) The Judge;
   i) The State or jurisdiction;
   j) The type of underlying lawsuit or action in the litigation information;
   k) The accusations embodied within the underlying lawsuit or action in the litigation information;
   l) The Plaintiff(s);
   m) The Defendant(s);
   n) The number of plaintiffs associated with the underlying lawsuit or action in the litigation information;
   o) The number of defendants associated with the underlying lawsuit or action in the litigation information;
   p) The Insurer(s) associated with the insurance information;
   q) The Insurer(s) associated with one or more of the defendants;
   r) The Insurer(s) associated with one or more of the plaintiffs;
   s) The entity or entities administrating or collecting the proceeds of the lawsuit in the litigation information;
   t) The entity or entities administrating or collecting the recovery opportunity associated with the insurance information, right or recovery, right of reimbursement, unpaid debt or loan, credit balance, or unpaid or partially unpaid medical bill or service; and,
   u) The status of the lawsuit.

14. The computer system of claim 9, wherein the logic uses the resulting adjusted or non-adjusted level of confidence to eliminate or suppress what is deemed to be a false-positive match of the insurance payment information and the litigation information.

15. The computer system of claim 1, wherein the potential subrogation claim includes a Right of Recovery or a Right of Reimbursement.

16. The computer system of claim 1, wherein the potential third-party claim is an Estate Recovery or is referred to as an Estate Recovery.

17. The computer system of claim 1 wherein the patients, members, insureds, party or parties in lawsuits, include one or more:
   (a) individuals;
   (b) legal entities other than individuals; or
   (c) combinations of (a) and (b).

18. The computer system of claim 17, wherein the one or more legal entities other than individuals include corporations, partnerships, sole proprietorships, limited liability companies, limited liability partnerships, professional corporations, trade associations, educational associations, unions, charities, trusts, estates, trustees, and executors.

19. The computer system of claim 1, wherein the litigation information comprises claims corresponding to the parties in the lawsuits and the insurance payment information comprises information concerning payments made to or on behalf of the patients, members or insureds, and the logic:
   analyzes the claims in the lawsuits to determine a type of suit or claim involved; and
   assigns, based on the analysis of the claims in the lawsuits, insurance payment linking information to the claims, the insurance payment linking information operable to map or link claims in the litigation information to the information concerning payments made to or on behalf of the patients, members or insureds.

20. The computer system of claim 1, wherein the insurance payment linking information is medical diagnosis codes determined to be applicable to the type of suit or claim involved in the lawsuits and determined to be applicable to subrogation claims or third-party claims.

21. The computer system of claim 20, wherein the medical diagnosis code includes one or more of the following:

(a) a diagnostic related grouping (DRG) code category;
(b) an international classification of disease (ICD) code category;
(c) any insurance or medical industry standard diagnosis code category or terminology; or
(d) any combination of (a) through (c).

22. The computer system of claim 21, wherein the medical procedure code includes any insurance or medical industry standard diagnosis code category or terminology or disease category or procedural technique category regardless of whether said category or termination exists at the time of the invention or thereafter; or any combination thereof.

23. The computer system of claim 1, wherein an insurer
(a) uses the existence of the (1) potential third-party claim, (2) potential subrogation claim, (3) actual third-party claim, (4) actual subrogation claim, (5) actual third-party recovery, or (6) actual subrogation recovery to (B) adjust, recalculate or otherwise readjudicate the benefits of the insured.

24. The computer system of claim 1, wherein the insurance payment information includes at least one of the following:
(a) amounts paid or payable by an insurer for prescription drugs or medical devices, or
(b) information regarding the type of prescription drugs or medical devices utilized by the patient or insured.

25. The computer system of claim 1, wherein the potential third-party claim is the claim of one or more creditors which seek payment for an unpaid or partially unpaid loan or debt or credit balance from a borrower, account holder or debtor.

26. The computer system of claim 25, wherein the potential claim of one or more creditors which seek payment correlates to an individual, entity or guarantor associated with a bankruptcy filing identified in either a bankruptcy database or a database containing a field/information indicating bankruptcy.

27. The computer system of claim 1, wherein the potential third-party claim is the claim of one or more medical providers which seeks payment or reimbursement for an unpaid or partially unpaid medical bill or service.

28. The computer system of claim 27, wherein the logic simultaneously or subsequently identifies that the potential third-party claim or a potential subrogation claim (a) based on the insurance payment information indicates that the patient, member or insured is or may be responsible for payment to one or more medical Providers (or assignee or the subsequent owner of the rights to the Outstanding Patient Financial Responsibility) for a deductible, copayment, coinsurance or other patient-pay component (collectively the "Outstanding Patient Financial Responsibility"), (b) confirming whether or not the patient, member or insured has satisfied the Patient Financial Responsibility, and (c) identifying patients, members or insureds with an Outstanding Patient Financial Responsibility which have been directly or indirectly matched with the litigation information, or any combination thereof.

29. The computer system of claim 28, wherein the logic uses the Patient Financial Responsibility information to enhance or perfect the insurance payment information.

30. The computer system of claim 28, wherein the logic uses the insurance payment information to enhance or perfect the Patient Financial Responsibility information.

31. The computer system of claim 28, wherein the logic identifies the patient, member or insured with an Outstanding Patient Financial Responsibility and provides the patient information, member information, insured information, litigation information or any combination thereof to one or more of (a) the medical Provider(s), (b) the medical Provider's agent(s), (c) the medical Provider's assignee(s), or (d) the subsequent owner of the rights to the Outstanding Patient Financial Responsibility.

32. The computer system of claim 31, wherein the logic facilitates confirming whether or not the plaintiff in the lawsuit is the patient, member or insured, investigating the status of the patient, member or insured's Patient Financial Responsibility, and the viability of seeking reimbursement from the patient, member or insured as a result of their past, present or future proceeds from the lawsuit identified in the litigation information.

33. The computer system of claim 32, wherein the logic allows multiple lawsuits in the litigation information associated with a given defendant, defendant's insurer, plaintiff, plaintiff's insurer, attorney or any combination thereof to be investigated, negotiated or settled simultaneously.

34. The computer system of claim 31, wherein the logic uses the Patient Financial Responsibility information to enhance or perfect the insurance payment information.

35. The computer system of claim 31, wherein the logic uses the insurance payment information to enhance or perfect the Patient Financial Responsibility information.

36. The computer system of claim 31, wherein the logic facilitates investigating the status of the patient, member or insured's Outstanding Patient Financial Responsibility; assessing the viability of filing one or more medical provider liens (each a "Provider Lien") against a lawsuit identified in the litigation information; monitoring the progress of the lawsuit identified in the litigation information; negotiating the resolution of the Provider Lien; collecting the unpaid Outstanding Patient Responsibility (or the negotiated percentage thereof) from the proceeds of the lawsuit identified in the litigation information; paying the medical Provider(s) the amount to which they are entitled; invoicing the medical Provider(s) the fee, if any, associated with the services; retaining the fee, if any, associated with the services and reimbursing the medical Provider(s) the proceeds net of the fee; or any combination thereof.

37. The computer system of claim 36, wherein the logic analyzes and forecasts the allocation of a payment between (a) the Outstanding Patient Financial Responsibility and (b) the potential third-party claim or potential subrogation claim.

38. The computer system of claim 36, wherein the logic analyzes and forecasts the allocation of a payment between (a) the medical provider and (b) another party including but not limited to an insurer or payor.

39. The computer system of claim 36, wherein the logic analyzes and forecasts the allocation of a payment between parties including but not limited to the medical provider, an insurer or payor when negotiating and marketing services including but not limited to collection, investigation or identification.

40. The computer system of claim 36, wherein the logic administers the allocation of a payment between (a) the Outstanding Patient Financial Responsibility and (b) the potential third-party claim or potential subrogation claim.

41. The computer system of claim 36, wherein the logic administers the allocation of a payment between (a) the medical provider and (b) another party including but not limited to an insurer or payor.

42. The computer system of claim 36, wherein the logic allows multiple lawsuits in the litigation information associated with a given defendant, defendant's insurer, plaintiff, plaintiff's insurer, attorney or any combination thereof to be investigated, negotiated or settled simultaneously.

43. The computer system of claim 1, wherein the litigation information includes one or more of the following:
   a) Legal actions, suits, suits at law, judicial proceedings, legal proceedings;
   b) Arbitration hearings, proceedings or testimony;
   c) Mediation hearings, proceedings or testimony;
   d) Medical hearings, proceedings, inquiries or testimony and the results thereof, including but not limited to incident reviews, incident reports, Morbidity and Mortality Conferences or Reviews conducted by hospitals or other entities; and licensing actions
   e) Medical credentialing actions including but not limited to suspension or revocation of license; suspension or removal of privileges to practice medicine; suspension or removal of privilege to provide services at one or more given facilities; suspension, alteration, removal, or resumption of status within a payor or insurers medical provider network; suspension, alteration, removal or resumption of the medical provider's authorization to be compensated or reimbursed by a payor or insurer; and actions to recover, deny, or re-adjudicate payments to or claim submissions by one or more medical providers;
   f) Medical fraud actions including but not limited to direct action against one or more medical providers; decertification of one or more medical providers; suspension, alteration, removal, or resumption of status within a payor or insurers medical provider network; suspension, alteration, removal or resumption of the medical provider's authorization to be compensated or reimbursed by a payor or insurer; and actions to recover, deny, or re-adjudicate payments to or claim submissions by one or more medical providers; claims registries including those involving class actions or mass torts;
   g) Medical fraud actions including but not limited to direct action against one or more medical device manufacturers or distributors; decertification of one or more Medical Device manufacturers or distributors; suspension, alteration, removal or resumption of status within a payor or insurers medical provider network; suspension, alteration, removal or resumption of the medical device manufacturer's or distributor's authorization to be compensated or reimbursed by a payor or insurer; recalls or recall notices related to any manufactured or distributed medical device; and actions to recover, deny, or re-adjudicate payments to or claim submissions by one or more medical providers involving any procedure using a manufactured or distributed medical device; claims registries including those involving class actions or mass torts;
   h) Medical fraud actions including but not limited to direct action against one or more Pharmaceutical manufacturers or distributors; decertification of one or more Pharmaceutical manufacturers or distributors; suspension, alteration, removal or resumption of status within a payor or insurers medical provider network; suspension, alteration, removal or resumption of the Pharmaceutical manufacturer's or distributor's authorization to be compensated or reimbursed by a payor or insurer; recalls or recall notices related to any manufactured or distributed medical device; and actions to recover, deny, or re-adjudicate payments to or claim submissions by one or more medical providers involving any procedure using a manufactured or distributed Pharmaceutical; claims registries including those involving class actions or mass torts;
   i) claims submitted against or to property and casualty insurance companies or self-insured entities;
   j) claims submitted against or to workers compensation insurance companies or self-insured entities;
   k) Workers Compensation cases, claims, hearings, proceedings or testimony;
   l) claims submitted against disability insurance companies or self-insured entities;
   m) Recall notices or proceedings related to product recall;
   n) Administrative proceedings involving union contracts or related grievances;
   o) Investigative hearings, proceedings, testimony or actions including but not limited to those associated with Federal Agencies or entities; State Agencies or entities; local Agencies or entities; healing arts boards or similar entities overseeing medical facilities or professionals; State Bar Associations; attorney discipline committees or similar entities overseeing attorneys and other legal professionals; federal, state or local entities overseeing any other pertinent professional; trade or similar entities which certify, credential or provide title to individuals including but not limited to Society or Actuaries, a State Board of Accountancy or other entity which licenses and/or credentials Certified Public Accountants, Joint Commission on Hospitals, and religious organizations which oversee and/or certify churches and/or clergy;
   p) Regulatory hearings, proceedings testimony or actions including but not limited to those associated with Federal Agencies or entities; State Agencies or entities; local Agencies or entities; healing arts boards or similar entities overseeing medical facilities or professionals; State Bar Associations; attorney discipline committees or similar entities overseeing attorneys and other legal professionals; federal, state or local entities overseeing any other pertinent professional; trade or similar entities which certify, credential or provide title to individuals including but not limited to Society or Actuaries, a State Board of Accountancy or other entity which licenses and/or credentials Certified Public Accountants, Joint Commission on Hospitals, and religious organizations which oversee and/or certify churches and/or clergy;
   q) Criminal grand jury hearings, proceedings or testimony;
   r) Criminal indictments, hearings, proceedings or testimony;
   s) Testimony to Federal, State, Municipal, County or City legislative bodies, including but not limited to Congressional testimony, Legislative testimony, County Commission testimony, City Council testimony;
   t) Media or news or press accounts, media or news or press releases, or media or Currently news or press statements regarding accidents, incidents, lawsuits or litigation; and
   u) Date information including but not limited to date of accident, date of incident, date of injury, date of medical procedure, date of submission, lawsuit filing date and date of any of the information listed elsewhere in this claim.

44. The computer system of claim 43, wherein the litigation information is enhanced through an analysis, investigation, or review of other litigation information.

45. The computer system of claim 43, wherein information gathered following the review or investigation of one or more matches of the insurance payment information and the litigation information is used to supplement the insurance payment information, the litigation information, or any combination thereof.

46. The computer system of claim 45, wherein multiple lawsuits in the litigation information associated with a given defendant, defendant's insurer, plaintiff, plaintiff's insurer, attorney or any combination thereof are investigated, negotiated or settled simultaneously.

47. The computer system of claim 1, wherein the logic uses the resulting adjusted or non-adjusted level of confidence to eliminate or suppress what is deemed to be a false-positive match of the insurance payment information and the litigation information.

48. The computer system of claim 1, wherein the logic estimates the value of the underlying lawsuit contained in the litigation information based on one or more considerations such as:
 a) The Court(s);
 b) The Defense Attorney(s);
 c) The Plaintiff Attorney(s);
 d) Any party or parties asserting a subrogation or Third-party claim;
 e) The Subrogation or Third-party claim Attorney(s);
 f) The age or date of the action in the litigation information;
 g) Composition, value, age or magnitude of the claims alleged in the litigation information;
 h) Composition, value, age or magnitude of the claims within the insurance payment information;
 i) The medical condition or diagnosis or diagnosis codes associated with the claims alleged in the litigation information;
 j) The medical condition or diagnosis or diagnosis codes associated with the claims within the insurance payment information;
 k) The medical provider(s) or type of medical provider(s) associated with the claims alleged in the litigation information;
 l) The medical provider(s) or type of medical provider(s) associated with the claims within the insurance payment information;
 m) The Judge;
 n) The State or jurisdiction;
 o) The type of underlying lawsuit or action in the litigation information;
 p) The accusations embodied within the underlying lawsuit or action in the litigation information;
 q) The Plaintiff(s);
 r) The age of Plaintiff(s);
 s) The work status of Plaintiff(s);
 t) The life or death status of Plaintiff(s);
 u) The Defendant(s);
 v) The number of plaintiffs associated with the underlying lawsuit or action in the litigation information;
 w) The number of defendants associated with the underlying lawsuit or action in the litigation information;
 x) The Insurer(s) associated with the insurance information;
 y) The Insurer(s) associated with one or more of the defendants;
 z) The Insurer(s) associated with one or more of the plaintiffs;
 aa) The entity or entities administrating or collecting the proceeds of the lawsuit in the litigation information;
 bb) The entity or entities administering or collecting the recovery opportunity associated with the insurance information, right of recovery, right of reimbursement, unpaid debt or loan, credit balance, or unpaid or partially unpaid medical bill or service; and
 cc) The status of the lawsuit.

49. The computer system of claim 48, wherein the logic estimates the value of a given component of the underlying lawsuit, including but not limited to one or more plaintiffs, defendants, insurers, courts, medical providers, or administrators.

50. The computer system of claim 48, wherein the estimated value is used to support the application, underwriting, valuation or ongoing administration of a loan or guarantee.

51. The computer system of claim 1, wherein the logic estimates the timing of the underlying lawsuit contained in the litigation information based on one or more of:
 a) The Court(s);
 b) The Defense Attorney(s);
 c) The Plaintiff Attorney(s);
 d) Any party or parties asserting a subrogation or Third-party claim;
 e) The Subrogation or Third-party claim Attorney(s);
 f) The age or date of the action in the litigation information;
 g) Composition, value, age or magnitude of the claims alleged in the litigation information;
 h) Composition, value, age or magnitude of the claims within the insurance payment information;
 i) The medical condition or diagnosis or diagnosis codes associated with the claims alleged in the litigation information;
 j) The medical condition or diagnosis or diagnosis codes associated with the claims within the insurance payment information;
 k) The medical provider(s) or type of medical provider(s) associated with the claims alleged in the litigation information;
 l) The medical provider(s) or type of medical provider(s) associated with the claims within the insurance payment information;
 m) The Judge;
 n) The State or jurisdiction;
 o) The type of underlying lawsuit or action in the litigation information;
 p) The accusations embodied within the underlying lawsuit or action in the litigation information;
 q) The Plaintiff(s);
 r) The age of Plaintiff(s);
 s) The work status of Plaintiff(s);
 t) The life or death status of Plaintiff(s);
 u) The Defendant(s);
 v) The number of plaintiffs associated with the underlying lawsuit or action in the litigation information;
 w) The number of defendants associated with the underlying lawsuit or action in the litigation information;
 x) The Insurer(s) associated with the insurance information;
 y) The Insurer(s) associated with one or more of the defendants;
 z) The Insurer(s) associated with one or more of the plaintiffs;
 aa) The entity or entities administrating or collecting the proceeds of the lawsuit in the litigation information;
 bb) The entity or entities administering or collecting the recovery opportunity associated with the insurance information, right of recovery, right of reimbursement, unpaid debt or loan, credit balance, or unpaid or partially unpaid medical bill or service; and cc) The status of the lawsuit.

52. The computer system of claim 51, wherein the logic estimates the timing of a given component of the underlying lawsuit, including but not limited to one or more plaintiffs, defendants, insurers, courts, medical providers, or administrators.

53. The computer system of claim 51, wherein the estimated value is used to support the application, underwriting, valuation or ongoing administration of a loan or guarantee.

54. The computer system of claim 1, wherein the insurer (a) uses the existence of the (1) potential third-party claim, (2) potential subrogation claim, (3) actual third-party claim, (4) actual subrogation claim, (5) actual third-party recovery, or (6) actual subrogation recovery to (b) adjust, recalculate, or otherwise re-adjudicate the payment to one or more medical providers.

55. The computer system of claim 1, wherein the identifying that the type of lawsuit in the litigation information matched to the patient, member or insured in the insurance information correlates to the type of lawsuit (such as a medical malpractice lawsuit), accusation, or incident which may be associated with the business practices or a contractual provisions of the insurers contract with the defendant or a medical provider associated with the defendant.

56. The computer system claim 1, wherein the identifying that the type of lawsuit in the litigation information matched to the patient, member or insured in the insurance information correlates to the type of lawsuit (such as a medical malpractice lawsuit), accusation, or incident which may be associated with potential under-performance by the defendant based on the insurer's contract with the defendant or insurer's business practices.

57. The computer system claim 1, wherein the identifying that the type of lawsuit(s) or actions in the litigation information indicates potential fraud, waste or abuse, matching the lawsuit(s) or actions in the litigation data to one or more databases of medical and other providers and reporting the results.

58. The computer system claim 57, wherein the logic filters out medical and other providers which are already known or which have already been identified prior to the matching with the litigation data.

59. The computer system of claim 1, wherein the identifying that the type of lawsuit(s) in the litigation information indicates one or more criteria, such as, but not limited to underwriting criteria, and matches the lawsuit(s) in the litigation data to one or more databases of individuals or entities in order to generate a report of which individuals or entities potentially match one or more lawsuits associated with the given criteria.

60. The computer system of claim 59, wherein the identifying that the type of lawsuits in the litigation data matches one or more criteria associated with insurance underwriting, insurance marketing, or any combination thereof.

61. The computer system of claim 59, wherein the identifying the type of lawsuits in the litigation data matches one or more criteria associated with loan underwriting, loan marketing, or any combination thereof.

62. The computer system claim 1, wherein an identified patient with an amount payable to one or more medical providers whether or not the patient has insurance and regardless of the insurer or payor, regardless of whether (a) an amount is due from the patient since the amount is fully or partially unpaid due to the amount being uninsured, underinsured, deductible, copayment, coinsurance or other patient-pay component (collectively the "Outstanding Patient Financial Responsibility") or (b) no amount is due from the patient (the "Satisfied Patient Financial Responsibility") is directly or indirectly matched with one or more lawsuits in the litigation information; wherein the Outstanding Patient Financial Responsibility and Satisfied Patient Responsibility are collectively defined as the "Patient Financial Responsibility".

63. The computer system of claim 62, wherein the logic identifies the patient with an Outstanding Patient Financial Responsibility and provides the patient information, the lawsuit in the litigation information, or any combination thereof to one or more of (a) the medical Provider(s), (b) the medical Provider's agent(s), (c) the medical Provider's assignee(s), or (d) the subsequent owner of the rights to the Outstanding Patient Financial Responsibility.

64. The computer system of claim 63 wherein the logic confirms whether or not the plaintiff in the lawsuit in the litigation information is the patient, investigates the status of the patient's Outstanding Patient Financial Responsibility, and determines the viability of seeking reimbursement from the patient as a result of their past, present or future proceeds from the lawsuit in the litigation information.

65. The computer system of claim 63, wherein the logic facilitates the:
investigation of the status of the patient's Outstanding Patient Financial Responsibility;
assessment of the viability of filing one or more medical provider liens (each a "Provider Lien") against a lawsuit in the litigation information; monitoring the progress of the lawsuit in the litigation information; negotiating the resolution of each Provider Lien;
collecting the unpaid Outstanding Patient Responsibility (or the negotiated percentage thereof) from the proceeds of the lawsuit; paying the medical Provider(s) the amount to which they are entitled;
invoicing the medical Provider(s) the fee, if any, associated with the services; and
retaining the fee, if any, associated with the services and reimbursing the medical Provider(s) the proceeds net of the fee or any combination thereof.

66. The computer system of claim 62, wherein the logic simultaneously or subsequently identifies that the patient with a Patient Financial Responsibility may be subject to a potential third-party claim or a potential subrogation claim.

67. The computer system of claim 66, wherein the logic identifies the patient with a Patient Financial Responsibility and provides the patient information, member information, insured information, litigation information or any combination thereof to one or more Non-Provider Party ("Non-Provider Party") such as (a) the insurer (including but not limited to automobile, disability, health, home owners, property and casualty, and workers compensation) including self-insurer, (b) a governmental sponsored medical insurance or payment program or the administrator or agent thereof; (c) a creditor, (d) a debtor, (e) an underwriter, (f) another interested third-party or (g) the agent or assignee of any of the aforementioned entities.

68. The computer system of claim 67, wherein the logic facilitates confirming whether or not the plaintiff in the lawsuit is the patient, member or insured, investigating the status of the patient, member or insured's Patient Financial Responsibility, and the viability of seeking reimbursement from the patient, member or insured as a result of their past, present or future proceeds from the lawsuit identified in the litigation information.

69. The computer system of claim 68, wherein the logic allows multiple lawsuits in the litigation information associated with a given defendant, defendant's insurer, plaintiff, plaintiff's insurer, attorney or any combination thereof to be investigated, negotiated or settled simultaneously.

70. The computer system of claim 67, wherein the logic facilitates investigating the status of the patient, member or insured's with respect to the potential third-party claim or a potential subrogation claim of the Non-Provider Party; assessing the viability of pursuing the potential third-party claim or a potential subrogation claim; monitoring the progress of the lawsuit identified in the litigation information; negotiating the resolution of the potential third-party claim or a potential subrogation claim; collecting the potential third-party claim or a potential subrogation claim (or the negotiated percentage thereof) from the proceeds of the lawsuit identified in the litigation information; paying the Non-Provider Party(s) the amount to which they are entitled; invoicing the Non-Provider Party(s) the fee, if any, associated with the services; retaining the fee, if any, associated with the services and reimbursing the Non-Provider Party(s) the proceeds net of the fee; or any combination thereof.

71. The computer system of claim 70, wherein the logic analyzes and forecasts the allocation of a payment between (a) the medical provider and (b) another party including but not limited to an insurer or payor.

72. The computer system of claim 70, wherein the logic analyzes and forecasts the allocation of a payment between parties including but not limited to the medical provider, an insurer or payor when negotiating and marketing services including but not limited to collection, investigation or identification.

73. The computer system of claim 70, wherein the logic administers the allocation of a payment between (a) the Outstanding Patient Financial Responsibility and (b) the potential third-party claim or potential subrogation claim.

74. The computer system of claim 70, wherein the logic administers the allocation of a payment between (a) the medical provider and (b) another party including but not limited to an insurer or payor.

75. The computer system of claim 70, wherein the logic allows multiple lawsuits in the litigation information associated with a given defendant, defendant's insurer, plaintiff, plaintiff's insurer, attorney or any combination thereof to be investigated, negotiated or settled simultaneously.

76. The computer system of claim 70, wherein the logic analyzes and forecasts the allocation of a payment between (a) the Outstanding Patient Financial Responsibility and (b) the potential third-party claim or potential subrogation claim.

77. The computer system of claim 1, wherein the logic simultaneously or subsequently identifies that the potential third-party claim or a potential subrogation claim (a) based on the insurance payment information indicating that the patient, member or insured is or may be responsible for payment to one or more medical Providers (or assignee or subsequent owner of the rights to the Outstanding Patient Financial Responsibility) for a deductible, copayment, coinsurance or other patient-pay component (collectively the "Outstanding Patient Financial Responsibility"), (b) confirming whether or not the patient, member or insured has satisfied the Outstanding Patient Financial Responsibility, and (c) identifying patients, members or insureds with an Outstanding Patient Financial Responsibility which have been directly or indirectly matched with the litigation information, or any combination thereof.

78. The computer system of claim 77, wherein the logic identifies the patient, member or insured with an Outstanding Patient Financial Responsibility and provides the patient information, member information, insured information, litigation information or any combination thereof to one or more of (a) the medical Provider(s), (b) the medical Provider's agent(s), (c) the medical Provider's assignee(s), or (d) the subsequent owner of the rights to the Outstanding Patient Financial Responsibility.

79. The computer system of claim 1, wherein the logic further generates a report containing one or more matches of the insurance payment information and the litigation information.

80. The computer system of claim 79, wherein the report is refined or filtered based on pre-specified or contemporaneously specified specifications including but not limited to specifications of the user, report recipient, or insurer.

\* \* \* \* \*